USOO5802500A

United States Patent [19]
Ryan et al.

[11] Patent Number: 5,802,500
[45] Date of Patent: Sep. 1, 1998

[54] SYSTEM AND METHOD FOR COMPUTING A FINANCIAL PROJECTION OF A PREFUNDING PROGRAM FOR OTHER POSTRETIREMENT EMPLOYEE BENEFITS UNDER FASB STATEMENT 106

[75] Inventors: Raymond B. Ryan, Darien, Conn.; Noah F. Gans, New York, N.Y.

[73] Assignee: The Evergreen Group Incorporated, Stamford, Conn.

[21] Appl. No.: 961,774

[22] Filed: Oct. 14, 1992

Related U.S. Application Data

[63] Continuation-in-part of Ser. No. 878,809, May 6, 1992, abandoned.

[51] Int. Cl.⁶ .................................................. G06F 19/00
[52] U.S. Cl. ............................. 705/36; 705/1; 705/4; 705/10; 705/31
[58] Field of Search .................. 364/400, 401, 364/402, 406, 408; 705/31, 36, 1, 10, 4

[56] References Cited

U.S. PATENT DOCUMENTS

| | | | |
|---|---|---|---|
| 4,642,768 | 2/1987 | Roberts | 364/408 |
| 4,648,037 | 3/1987 | Valentino | 364/408 |
| 4,722,055 | 1/1988 | Roberts | 364/408 |
| 4,750,121 | 6/1988 | Halley | 364/408 |
| 4,837,693 | 6/1989 | Schotz | 364/408 |
| 4,839,804 | 6/1989 | Roberts | 364/408 |
| 4,933,842 | 6/1990 | Durbin | 364/408 |
| 4,969,094 | 11/1990 | Halley | 364/408 |
| 5,136,502 | 8/1992 | Van Remortel et al. | 364/413.01 |

OTHER PUBLICATIONS

Custis, Thomas K.; "Coping with Retiree Health Benefits", *Management Accounting*, vol. 72, No. 10, pp. 22–26, Apr. 1991 (Dialog article, Accession No. 00544702).

Young, "Two Strategies Plotted for Health," *The Journal of Commerce*, Jul. 27, 1987.

Bacon, "Benefits —Rule Migraine," *Nation's Business*, pp. 22–25, Oct. 1988.

Bhatia, "Prefunding Retiree Health Benefits: A Proper Nest Egg?" *CFO*, Jul. 10, 1987.

"Corporate–Owned Life Insurance Set for Utility Retiree Claim Woes," *Utility Spotlight*, Jul. 10, 1987.

Freudenheim, "Company Expenses for Retirees Soar," *New York Times*, Sep. 9, 1988.

Gulotta, "The Liability Time Bomb is Ticking," *Chief Executive*, Jan./Feb., 1988.

"Insurance Consultant Address Unfunded Health Care Liabilities," *Insurance Advocate*, Jul. 11, 1987.

"Issue: Managing Retiree Medical Benefits," *Corporate Public Issues*, Jun. 1, 1988.

"Mass Mutual to Push Variable Insurance as Retiree Health–Care Savings Vehicle," *Money Management Letter*, Jun. 27, 1988.

Rees, "Post–retirement Employee Health Care Benefits Have Firms Struggling to Meet Mounting Costs," *Los Angeles Business Journal*, Apr. 18, 1988.

Roel, "Retirees Fight Cost Increases," *New York Newsday*, Sep. 18, 1989.

(List continued on next page.)

*Primary Examiner*—Robert A. Weinhardt
*Assistant Examiner*—Joseph Thomas
*Attorney, Agent, or Firm*—Peter K. Trzyna; Baker & McKenzie

[57] ABSTRACT

A computer system, and a method for using the system, for computing financial data, the computer system including a digital computer connected to receive information representing a description of a taxable trust and a description of life insurance contracts from data input means, to output computed data to a data presentation means, and to save said output data to a means for electronically storing output data; and means for automatically controlling the computer to compute the data from the information, the data representing a financial projection of a prefunding program for Other Postretirement Employee Benefits under FASB Statement 106.

7 Claims, 12 Drawing Sheets

OTHER PUBLICATIONS

Rosenberg, "Defusing the Postretirement Time Bomb," Institutional Investor, May, 1988.

Sloane, "Proposal Seeks to Aid Retiree Health Funds," The New York Times, Jun. 22, 1987.

Van Remortel, "Retiree Health Benefit Liability Reaches the Crisis Point," Pension World, Aug. 1988.

Wall Street Journal Report, "Many Matters —Ticking Time Bomb," WCBS–TV 11 a.m., Feb. 19, 1989.

Williams, "Health Liability Funding," Pensions & Investment Age, Jan. 25, 1988.

Young, "Life Insurance Proposed to Fund Retiree Plans," The Jounral of Commerce, Jun. 29, 1987.

Internal Revenue Code, § 4194A, 1988.

Prefunded Retiree Medical Investment Trust —PREMIT Booklet and Program Source Book (1988).

"Prefunded Retiree Medical Investment Trust —An Executive Overview," Brown Bridgman & Co., Retiree Health Care Group —Spring 1990.

PREMIT Brochure (Aug., 1991).

Letter from Raymond B. Ryan describing the potential for funding a VEBA Trust with variable life insuracne and estimates how much a company might be able to fund on a tax–deductible basis.

Treasury Circular 230.

Rev. Rul. 69–382.

IRS Technical Advice Memorandum 7810004.

Rev. Rul 73–559.

Draft of a VEBA Trust agreement from Dec. 21, 1987.

Letter dated Mar. 21, 1988, from a company other than Evergreen.

Marketing Materials from a company other than Evergreen.

Letter dated Oct. 4, 1988, from Raymond B. Ryan.

An Oct. 14, 1988, marketing presentation using overheads made by Evergreen to another company.

Prefunding Health Care Commitments, dated Nov. 2, 1988.

LOTUS–BASED Software from Nov. 2, 1988.

Marketing Materials dated Mar. 27, 1989.

Letter dated Mar. 8, 1989, from Raymond D. Ryan.

Presentation made by Evergreen to a corporation dated Apr. 26, 1989.

VEBA Funding Proposal made by Evergreen to another company.

Prudential Brochure, Group Variable Trust Owned Life Insurance dated Feb., 1991.

SYSTEM AND METHOD FOR COMPUTING A FINANCIAL PROJECTION OF A PREFUNDING PROGRAM FOR OTHER POSTRETIREMENT EMPLOYEE BENEFITS UNDER FASB STATEMENT 106

This is a continuation-in-part of U.S. patent application Ser. No. 07/878.809 filed May 6, 1992, abandoned.

TECHNICAL FIELD

This invention concerns an electric computer and a data processing system, and methods involving the same, applied to the financial fields of insurance and benefit funding. More particularly, this invention relates to a computer system for analyzing and projecting the after-tax cash flow and the balance sheet and income statement consequences of a prefunding program for Other Postretirement Employee Benefits (OPEBs).

BACKGROUND OF THE INVENTION

Until recently, the principal method of accounting for OPEB expenses has been the pay-as-you-go method of accounting. Under the pay-as-you-go accounting method, a corporation only recognizes those costs that it actually pays in cash. It does not recognize the costs it will have to pay in the future.

In December of 1990, the Financial Accounting Standards Board (FASB) issued accounting standard Statement 106 relating to accounting for OPEB costs—costs that primarily include retiree health care and retiree life insurance benefits. Very briefly, Statement 106 requires "calendar year" corporations reporting under Generally Accepted Accounting Principles (GAAP) to use an accrual method of accounting for OPEBs by 1993, although the FASB has encouraged earlier implementation.

This change in accounting rules will have a significant impact on any company with OPEB liabilities. First, the change will mean that corporations will be required to show on their balance sheets the present value of the expected future cost of paying for retiree health care benefits promised to employees and retirees. The accounting standard requires companies to project this value taking into account anticipated medical inflation rates. With medical cost inflation racing ahead of general inflation, for many companies this liability is significant. The amount may equal a sizeable portion of their book net worth and total in the billions of dollars. For example, in 1991 IBM announced that its liability for these costs would be in excess of $2 billion. In the same year General Motors Corporation announced that its liability would exceed $16 billion.

Second, the new accounting standard will require corporations to accrue this expense during the working life of the employee, rather than record it as an expense only as it is paid. This has the effect of moving a future expense into the present. For most companies the impact of the new accounting standard will be to create a book expense equal to three to six times the current pay-as-you-go costs.

Under Statement 106 a corporation may use assets contributed to certain qualified trusts as an offset to the accrued liability the statement requires to be recorded on a company's balance sheet. Furthermore, the new accounting standard will permit recognition of the growth in trust assets as an offset to the accrual expense charge for OPEBs.

In prefunding for OPEBs the U.S. tax rules have more restrictions than those that apply to qualified pension trusts. Of the alternative choices in trust financial vehicles, the collectively bargained employee Voluntary Employee Beneficiary Association (VEBA) and the non-collectively bargained employee VEBA trust stand out as the primary vehicles. Both types of VEBAs are organized as trusts qualifying under Internal Revenue Code Section 501 (c)(9). A problem with the non-collectively bargained employee VEBA trust is that prefunding for retiree health and life benefits causes the income from the trust assets to become subject to tax at the trust's tax rate. Tax lawyers and accountants have pointed out that an effective means of eliminating the tax at the VEBA trust is for the Trustee to invest the VEBA trust's funds in a specially designed universal or variable life insurance product. The insurance is placed on the lives of active employees who are expected to become beneficiaries of the trust (i.e., receive retiree health care and/or life benefits). Presently, tax rules permit policy cash value to grow free from taxation as long as a valid life insurance contract is in force; also, policy death proceeds are exempt from taxation under the Internal Revenue Code.

There is a second funding issue that must be addressed when using a non-collectively bargained VEBA trust. Only specified contribution amounts are allowed as tax deductible advance funding deductions. The deduction limit is referred to as the Qualified Asset Account Limit (QAAL). In order to claim a QAAL advance funding deduction, a certification is required by an actuary as to the reasonableness of the amount.

The combination of a VEBA or other taxable trust with specially designed life insurance contracts is typically referred to as TOLI (Trust Owned Life Insurance). In order to effectively market TOLI and administer existing TOLI plans, it necessary to create forecasts that accommodate the unique cash flow, earnings effect, and balance sheet attributes of insurance contracts placed in juxtaposition to the Statement 106 expense charges and liability accruals. The forecasts must also take into account limitation on the ability to make tax deductible contributions to the VEBA trust.

Prior to this invention, there existed a number of sources for the computation of Statement 106 expense and liability forecasts. Even as the accounting rules were being debated by the FASB from 1989 through 1990, major actuarial firms and outside actuarial software vendors created systems to project book accrual expenses and liabilities. With the issuance of the Statement in December 1990, all these organizations quickly amended their software to accommodate the new accounting rules. Since the QAAL rules have been in the Internal Revenue Code since 1984, there was no requirement to update existing software designed to calculate and project the QAAL.

Prior to this invention, systems existed that compared the cash values of the life insurance to a simple arithmetic present value of the OPEBs. However, these present values were not computed in a fashion to fulfill the requirements of Statement 106; nor were they in accordance with a proposed Statement on this same issue released by the FASB in February 1989. Finally, systems existed that reflected the earnings effect of prefunding with TOLI under a pay-as-you-go accounting environment. Still these systems did not take into account accrual accounting under Statement 106. These software programs failed to provide useful decision making information that would permit a corporation to estimate the financial accounting impact of prefunding with TOLI under Statement 106 accrual accounting for OPEBs.

For reasons outlined above, it would be highly desirable to have a system that would be able to take into account a large number of input variables generally available from a large number of different providers, including projections of the QAAL from consulting actuaries or accountants and their software systems, projections of insurance values from insurance carriers, corporate retiree health care cost projections from corporations, corporate tax data, corporate investment assumption data, and other corporate data, and compute the corporate earnings and balance sheet implications of prefunding assuming accrual accounting under Statement 106 to the corporation.

SUMMARY OF THE INVENTION

Therefore the invention has as a principal objective to automatically provide financial analytical data, incorporating the accounting implications of Statement 106, for evaluating use of TOLI as an investment within a VEBA Trust for prefunding OPEB liabilities.

Another object of the invention is to provide a system and method for calculating the premium necessary to effect the prefunding of the OPEB obligation of a corporation taking into account the benefits from a TOLI investment and the effects of accrual accounting under Statement 106.

Still another object of the invention is to provide a system and method for calculation of the earnings impact of prefunding for OPEBs using a VEBA in connection with TOLI, and taking into account the effects of accrual accounting under Statement 106.

Still another object of the invention is to provide a system and method for calculating the degree to which accumulated VEBA Trust TOLI asset reserves offset the Statement 106 obligation.

Still another object of the invention is to provide a system and method for calculating the financial impact of funding for OPEBs assuming corporate borrowing of the prefunding amounts, and taking into account the effects of accrual accounting under Statement 106.

Still another object of the invention is to provide a system and method for calculating the gross and incremental cash flow consequences of prefunding for OPEBs, taking into account the performance from investments in TOLI and the effects of accrual accounting under Statement 106.

Still another object of the invention is to provide a system and method for making the aforementioned computations on an on-going annual basis in order to permit a corporation to adjust its VEBA contributions and TOLI funding each year.

Still another object of the invention is to provide a system and a method of calculating the deferred income tax consequences of prefunding for OPEBs, taking into account the performance from the investments in TOLI and the effects of accrual accounting under statement 106.

Yet another object of the invention is to provide a system and method for making the aforementioned computations iteratively, in order to conduct sensitivity analyses which will better permit the corporation to understand, and ultimately enter into, an OPEB funding transaction, taking into account the effects of Statement 106.

These and other objects are addressed by a digital computer controlled by a computer program programmed to provide financial analytical data, incorporating the requirements of Statement 106, for use in evaluating the use of TOLI as an investment in connection with a VEBA trust for prefunding OPEB liabilities. The computer system of the present invention includes a digital computer connected to receive information representing a description of a taxable trust and a description of life insurance contracts from a data input means. The digital computer also outputs computed data to a data presentation means and saves the output data to a means for electronically storing output data. The system also has a means for automatically controlling the computer to compute the data from the information. The data represents a financial projection of a prefunding program for Other Postretirement Employee Benefits under Statement 106.

The computer system uses information obtained from a variety of sources, such as Statement 106 expense and liability projections, QAAL projections, insurance product performance projections and corporate specific data such as tax rates, number of shares outstanding. The system assumes that a corporation will contribute to a VEBA which is funded with TOLI assets and which uses Statement 106 accrual accounting, and it uses the data to project the corporate balance sheet and earnings effects.

Computer system output, shown by means of a monitor or printer, permits a determination of whether or not a funding proposal will be contributing to earnings per share, and if so, how much by year. Furthermore, the extent to which it is possible to reduce or offset the Statement 106 book liability on a year-by-year basis can also be determined. In addition, analytical schedules produced by the computer system show the effect of a resulting cost of borrowing or a cost of capital. Also, an analysis is prepared of the gross and incremental after-tax cash flow consequences of prefunding, the internal rates of return on funded assets with the benefit of advanced tax deductions and without the benefit of advanced tax deductions. With this information, it is possible to make an informed capital allocation decision to prefund (or not to prefund) for OPEBs using a VEBA trust in conjunction with TOLI.

From the point of view of a TOLI seller, the invention is essential. Obviously, without the information generated by the system, a corporate decision maker cannot determine the effect on his or her company of a VEBA/TOLI prefunding program. Without a detailed projection and understanding of the consequences of funding, it is not likely that a corporation will decide to prefund.

The invention also permits sensitivity analyses of various alternative assumptions to be illustrated. Corporations, as part of their due diligence process in evaluating a VEBA/ TOLI prefunding investment, may wish to change various assumptions and then view the results of those changes. Given the large number of variables and interdependencies, it is not possible to predict the result. For this reason empirical testing is required. Examples of sensitivity analyses made possible by this invention include preparing forecasts assuming different earnings rates in an insurance contract, assuming different amortization periods for the past service cost of retired lives under the QAAL computation, or assuming different rates of inflation for retiree health care benefits.

One of the important functions of the invention is to enable the user to project an amount of premium dollars that should be paid in accordance with the insurance product performance data. In order to maximize the tax benefits of prefunding for OPEBs, it is necessary to determine the maximum contribution to the VEBA for payment of TOLI premiums without exceeding the QAAL. The present invention performs this task.

After a VEBA/TOLI plan is installed, the present invention also has an important role to play. Before making each year's contribution to the trust, the corporate VEBA plan sponsor will want to prepare new financial forecasts to adjust the appropriate funding levels to reflect actual circumstances and new funding assumptions. The corporation will determine the level of funding depending on the expected future financial consequences projected by the invention.

BRIEF DESCRIPTION OF THE DRAWINGS AND TABLES

The aforementioned and other objects and features of this invention and the manner of attaining them will become apparent and the invention itself will be best understood by references to the following description of the invention in conjunction with accompanying drawings and table output.

1. FIGURES

Figure 1:
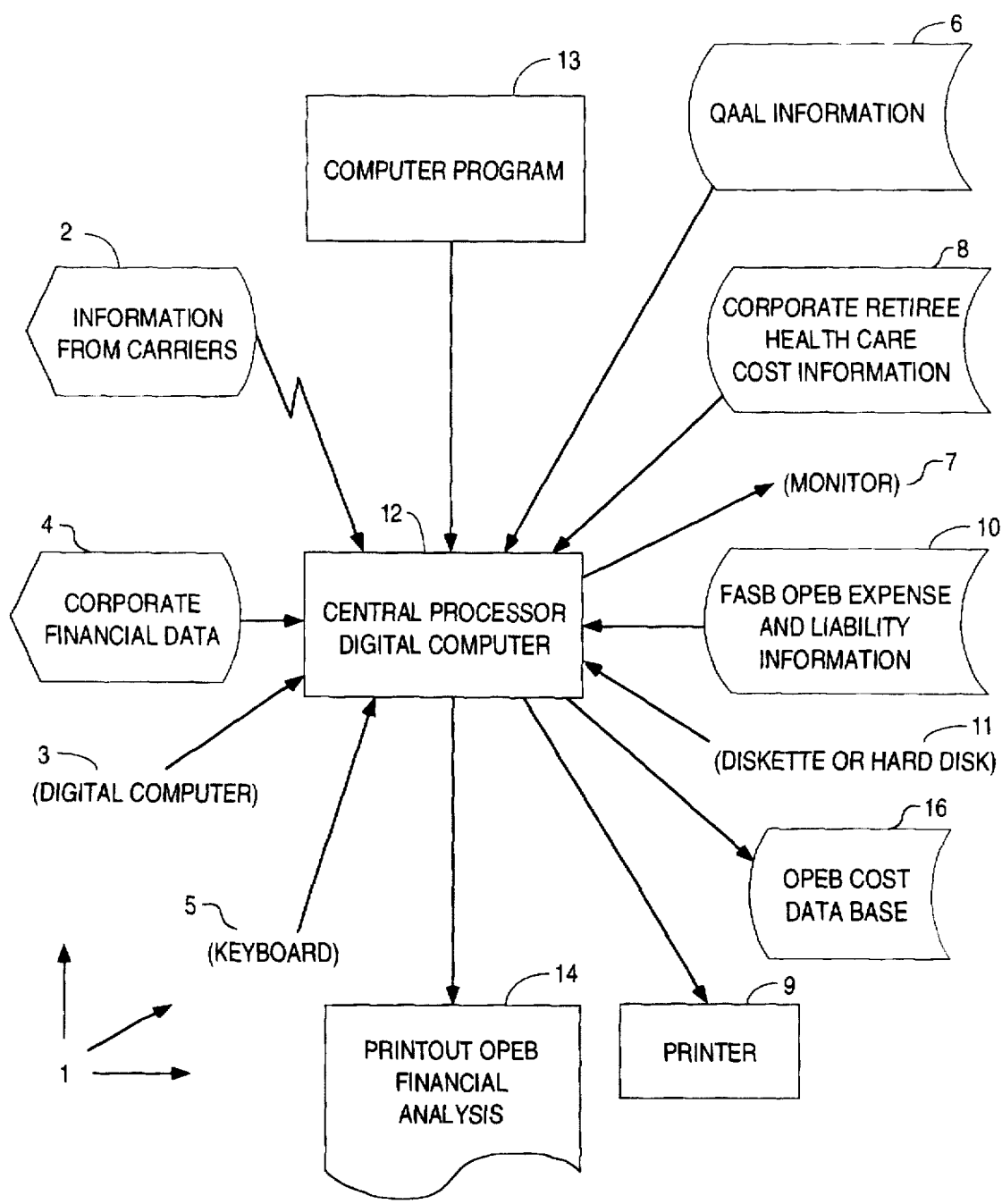
FIG. 1 is a flow chart representing the overall functioning of the invention.

FIGS. 3.0–3.9 are flow charts showing the principal computations of the system.

2. TABLES

Table 1, the first page of the system output, shows the assumptions used by the system in the computation of the output;

Table 2 is an example of system output including after-tax retiree medical cost, and the effect of this cost on corporate earnings per share over thirty years;

Table 3 is an example of the system's output of the after-tax corporate earnings per share impact of Statement 106, assuming accrual accounting and no prefunding of the obligation;

Table 4 is an example of the system's output regarding projected VEBA funding cash flow;

Table 5 is an example of the system's output, which provides an analysis of yearly cash accumulation within and corporate earnings from the VEBA trust;

Table 6 is an example of the system's output showing accumulated VEBA trust assets as an offset to the Statement 106 liability;

Table 7 is an example of the system's output showing the annual income statement effect to a corporation which has prefunded its Statement 106 liability using Trust Owned Life Insurance;

Table 8 is an example of the system's output showing the annual savings in earnings per share terms on an accrual basis under Statement 106 (the calculation of savings being based on a comparison of funding versus not funding for the OPEB obligation);

Table 9 is an example of the system's output, which compares debits to deferred income taxes with and without TOLI funding and displays the cumulative reduction in deferred-tax debits due to TOLI funding;

Table 10 is an example of the system's output showing the annual rate of return on the cash flow invested in the Trust Owned Life Insurance;

Table 11 is an example of the system's output of the annual return on incremental funds invested over the pay-as-you-go funding requirement, which the corporation would have paid whether or not it decided to prefund;

Table 12 is an example of the system's output of the after-tax earnings per share impact on the corporation assuming the corporation borrowed the funds needed to prefund the OPEB obligation;

Table 13 is an example of the system's output reflecting the annual after-tax cash flow to the corporation assuming it borrows the funds necessary to prefund the OPEBs obligation;

Table 14 is an example of the system's output reflecting the annual present value of the increase in corporate net worth assuming the corporation borrows the money needed to prefund the OPEBs obligation;

table 15 is an example of the system output showing asset growth in the Trust assuming the assets were not invested in life insurance, but were invested in taxable instruments instead;

Table 16 is an example of the system output comparing the accumulated assets in a trust investing in taxable instruments and a trust which has invested in Trust Owned Life Insurance;

Table 17 is an example of the system output comparing the accumulated assets of a trust investing in taxable instruments and a trust which has invested in TOLI and subsequently surrenders the TOLI contracts.

DETAILED DESCRIPTION OF A PREFERRED EMBODIMENT OF THE INVENTION

Referring now to FIG. 1, the overall functioning of an Financial Forecasting System 106 (FFS 106) Computer System 1 of the present invention is shown with odd numbers designating hardware and software, and even numbers designating program logic and data. The System 1 includes a Digital Computer 3, such as an IBM-compatible personal computer with a DOS operating system. Digital Computer 3 has a Keyboard 5, Monitor 7, Printer 9 (such as a dot-matrix or laser printer), and Means For Storing Electronic Output 11, such as a disc storage means. Of course other data input means such as modems, laser discs or magnetic tape may be substituted for Keyboard 5. In addition, other data presentation means such as plotters or monitors may be substituted for Printer 9. Computer 3 is controlled by a Computer Program 13, a LOTUS 123 (Version 3) computer program. A copy of Computer Program 13 is provided in Appendix A hereto. It is to be explicitly understood that other implementations of the present invention, say, those using a different kind of digital computer or a computer program written in a different language, are entirely acceptable and wholly equivalent.

The Computer System 1 uses the five distinct sets of input data, as shown on FIG. 1. Computer System 1 input includes Information from Carriers 2. This data is received from insurance carriers in response to a request for an illustration of insurance to be provided by the carrier. This data includes premium amounts, death benefits distributed (or reinvested in the policy), annual cash surrender values and annual after-tax cash surrender values of the life insurance contract (s). The data can be input via the Keyboard 5 from hard copy, or read from a disc, obtained from the carriers.

The next input item is Corporate Financial Data 4, which includes the corporate tax rate, the VEBA tax rate, the earnings rate for a taxable trust, the variable contract net earnings rate, the pre-tax corporate discount rates to be used in calculating corporate present values on cash flow with or without borrowing assumptions, the average estimated return on plan assets, and the number of corporate shares outstanding. If the corporation at issue is under an alternative minimum tax (AMT) structure, then the data will also include the AMT tax rate, the number of years under AMT, and the number of years to claim credit for past alternative minimum taxes. (The Internal Revenue Code presently imposes an additional tax on corporations in certain complex situations under the AMT codes. This additional tax then can be used as a credit against future income taxes once the corporation falls outside the AMT computation.)

Moving now to Block 6, the next input item is QAAL Information. This is the maximum tax deductible amount that an employer can contribute to the VEBA in each year of the forecast. The amounts are currently computed for corporations by numerous actuarial services or accounting firms such as Hewitt Associates, William M. Mercer, Price Waterhouse, and Coopers & Lybrand. This amount is projected for each year of the forecast period. Also, the discount rate used in the QAAL computation is recorded, as well as the retired and active employee amortization periods for prior service cost.

The next input item is Corporate Retiree Health Care Cost Information 8. This data comprises medical pay-as-you-go cost, medical cost inflation assumptions, mortality assumptions, retirement rates, census type, number of retired and active employees, and pre and post age 65 health care costs. These amounts are typically provided by the corporation or are submitted on behalf of the corporation by consulting actuaries or accountants.

Further input data includes FASB OPEB Expense and Liability Information 10, which comprises annual book expense and the annual book accrued liability amounts. These amounts are obtained from software available from numerous providers including Lynchval, ACTI, and many major actuarial consulting firms. Also, the Statement 106 discount rate is recorded into the computer system as part of Block 10.

These five sets of data are accessible to computer 3, which processes the data by means of computer program 13 according to the present invention to produce hard copy and electronic copy. The hard copy includes such output as is shown in Tables 1-17 (as denoted on FIG. 1 by Printout OPEB Financial Analysis 14). The electronic copy includes an electronic file, stored in a memory of computer 3 or such storage means as a disc in disc drive 11, of the input and output data (as denoted on FIG. 1 by OPEB Cost Data Base 16). Once these outputs are produced, either or both can be reviewed by a computer system user. If the results of the analysis are not satisfactory, the input items can be reviewed and altered, and a modified illustration request can be sent to the insurance carrier to obtain changed input for Block 2, and a new set of computations by the system. (Unsatisfactory results might include inadequate returns on the corporate investment or inadequate accumulation of funds in the life insurance policies illustrated, due to excess carrier loads or mortality charges, state premium taxes, discount rates that are too high, or the demographic profile of the corporation's insured population.)

Figure 2:
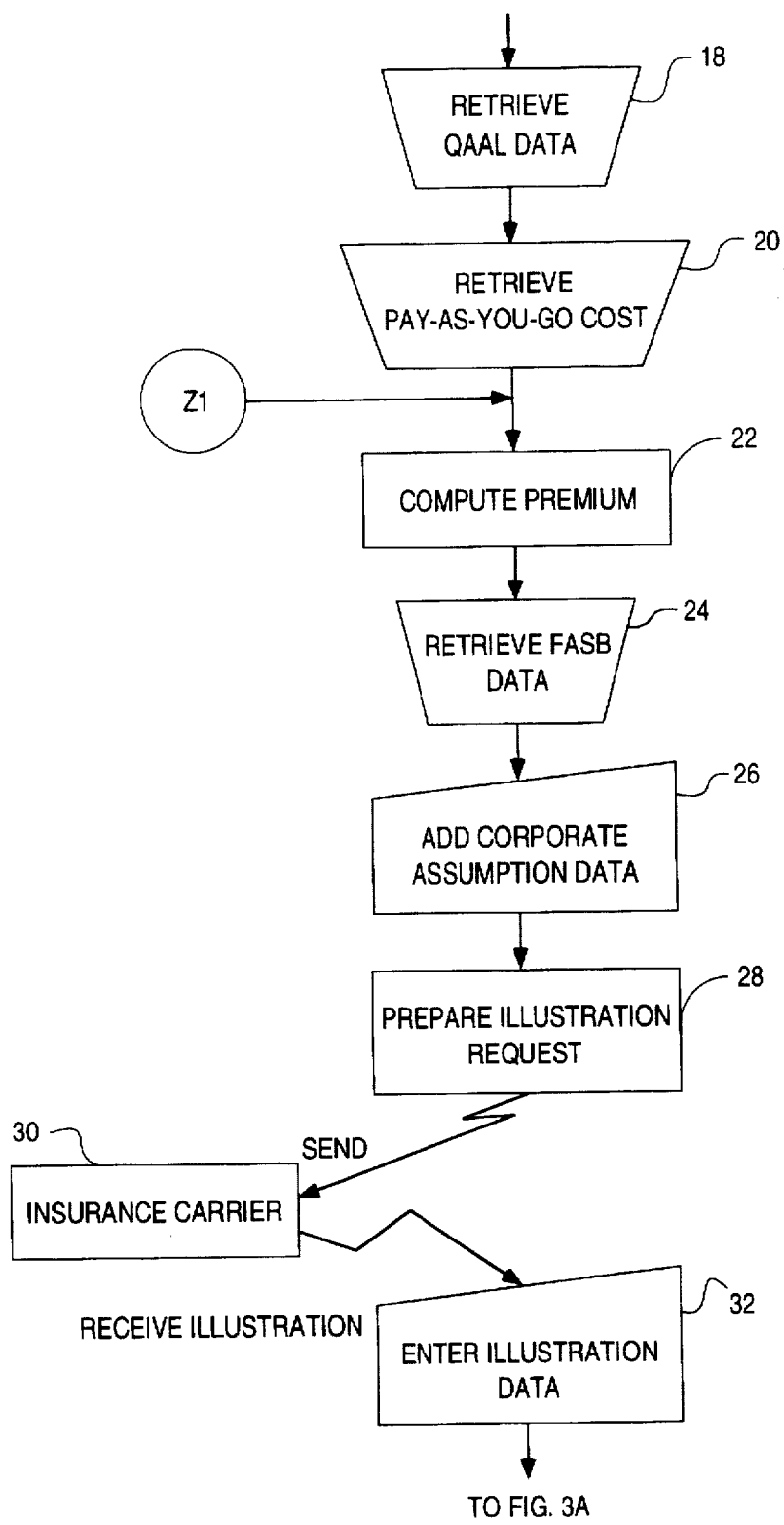
FIG. 2 is a flow chart showing the data input function of the invention.
Figure 3A:
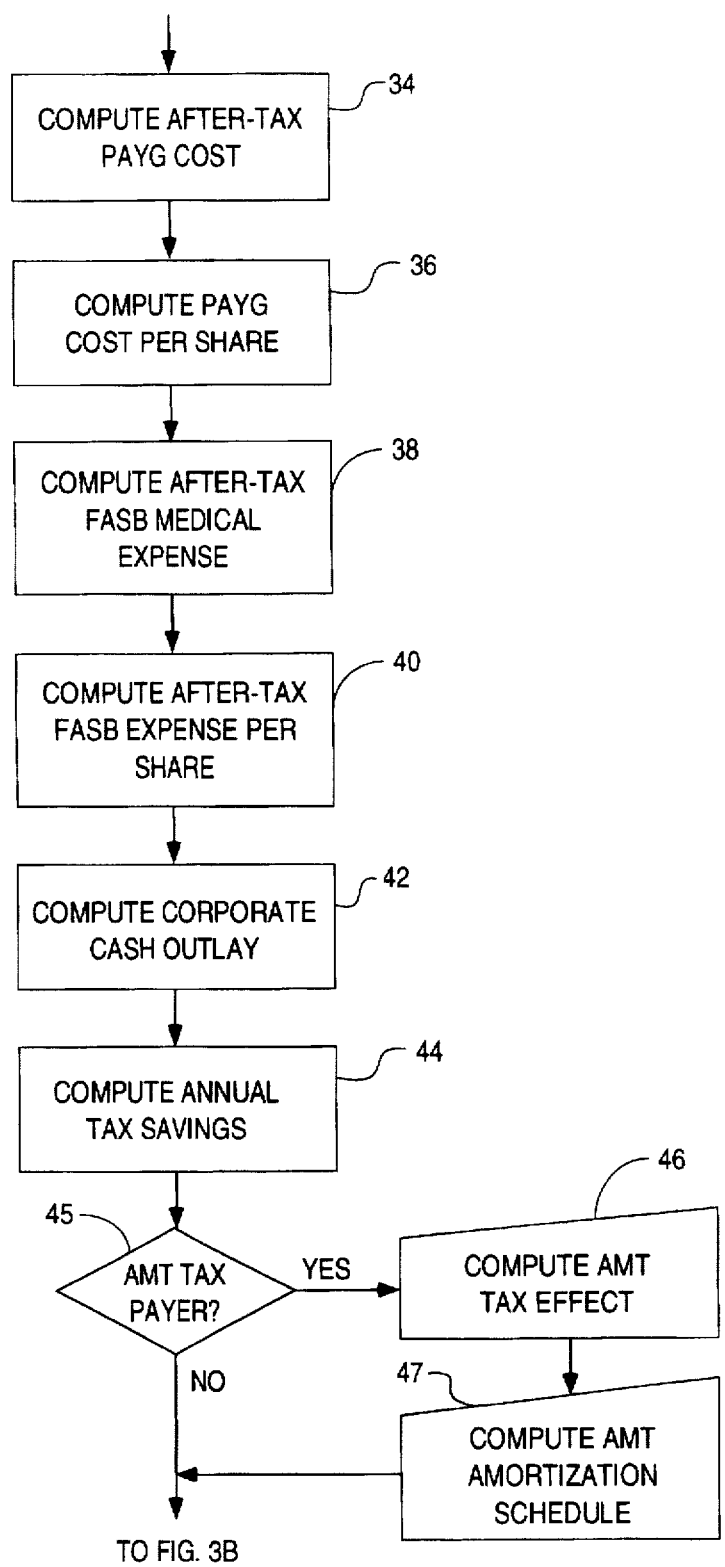
Figure 3B:
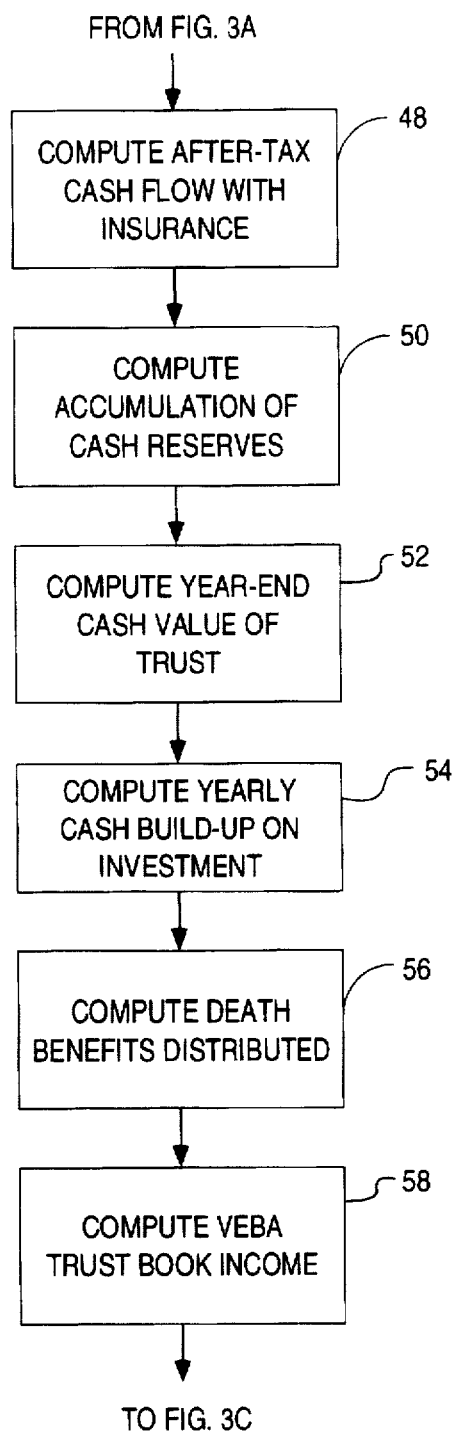
Figure 3C:
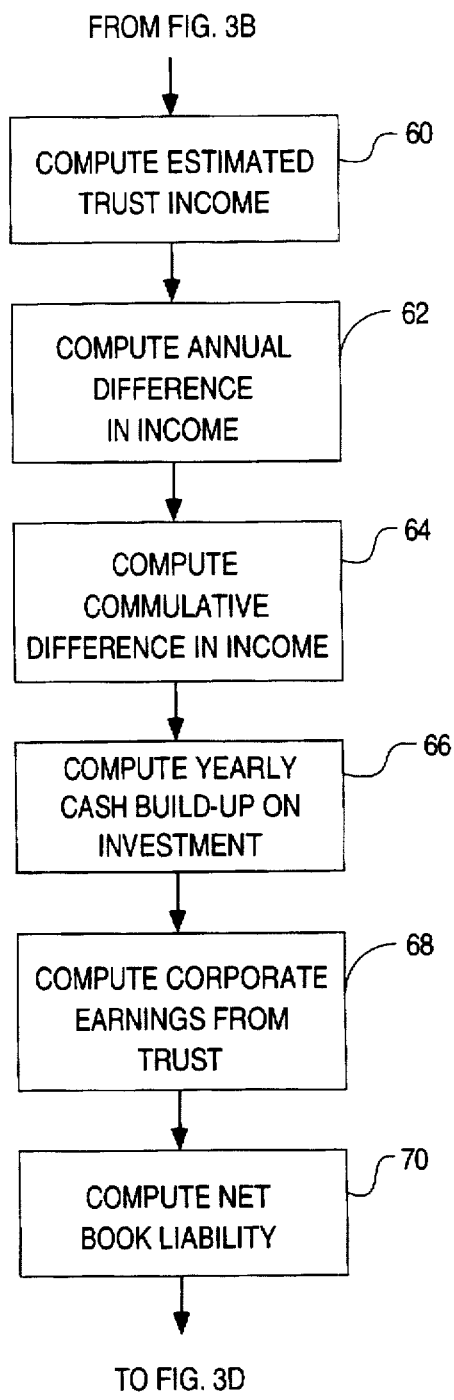
Figure 3D:
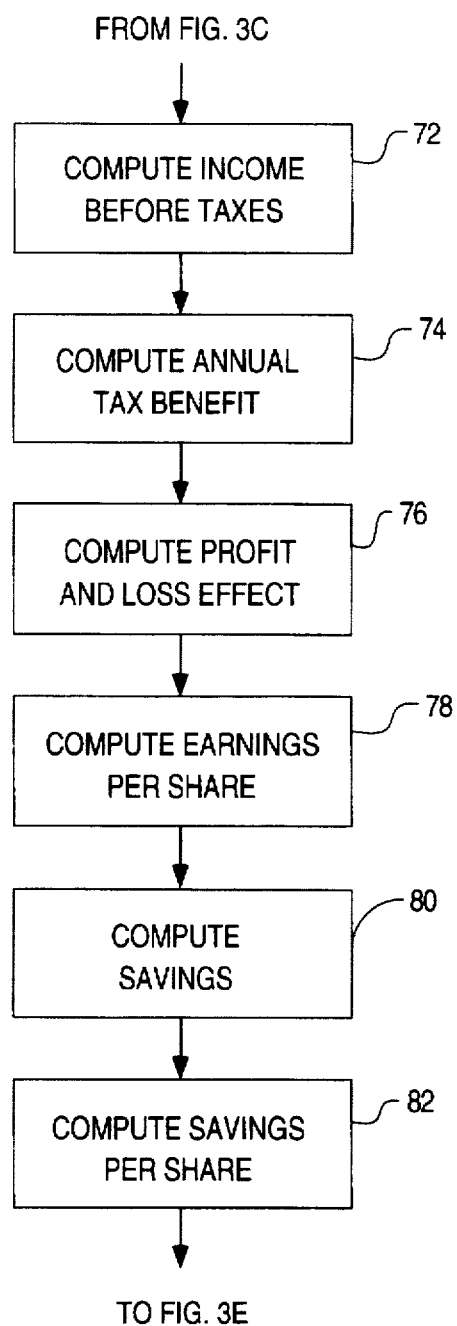
Figure 3E:
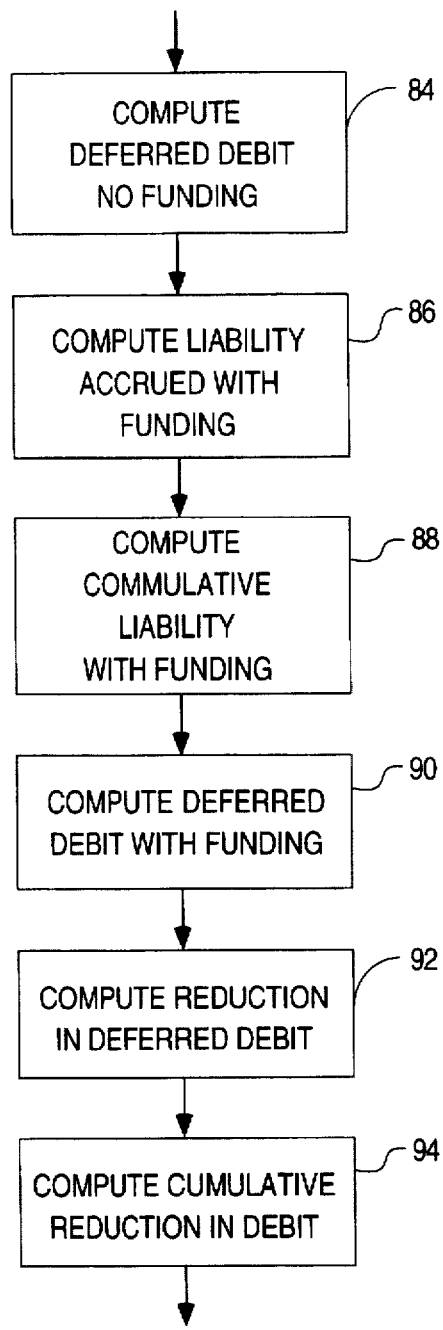
Figure 3F:
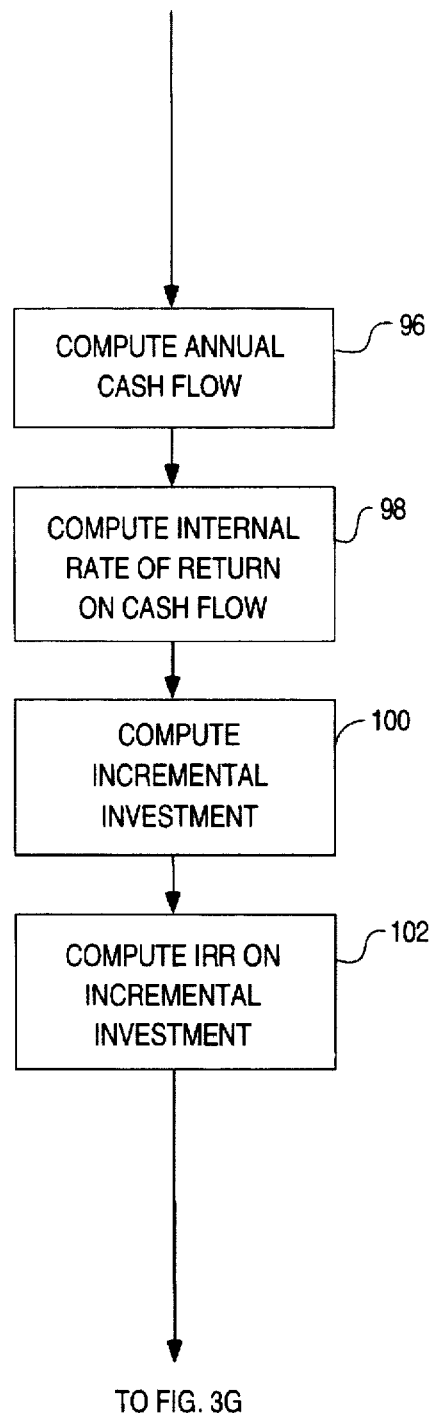
Figure 3G:
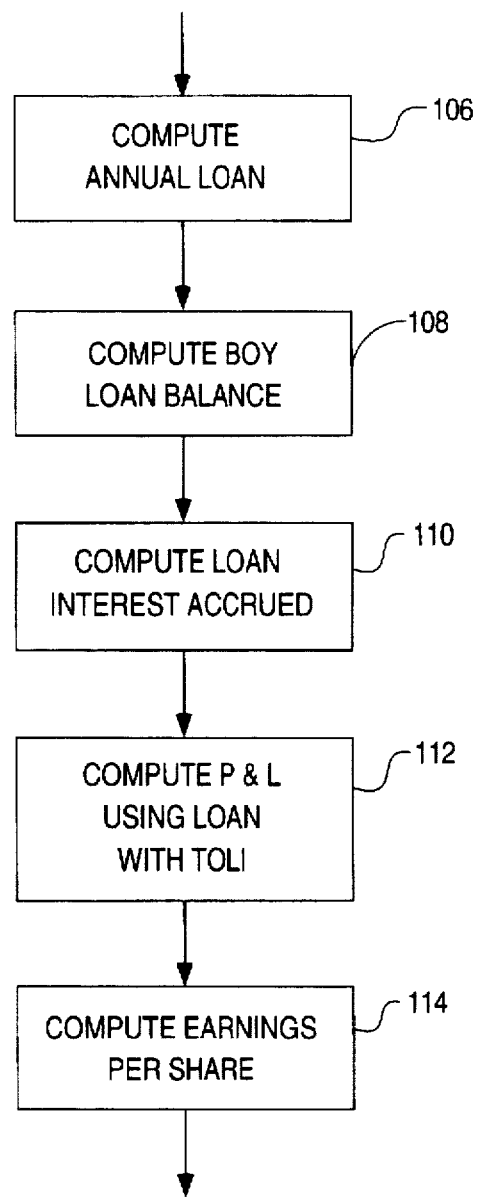
Figure 3H:
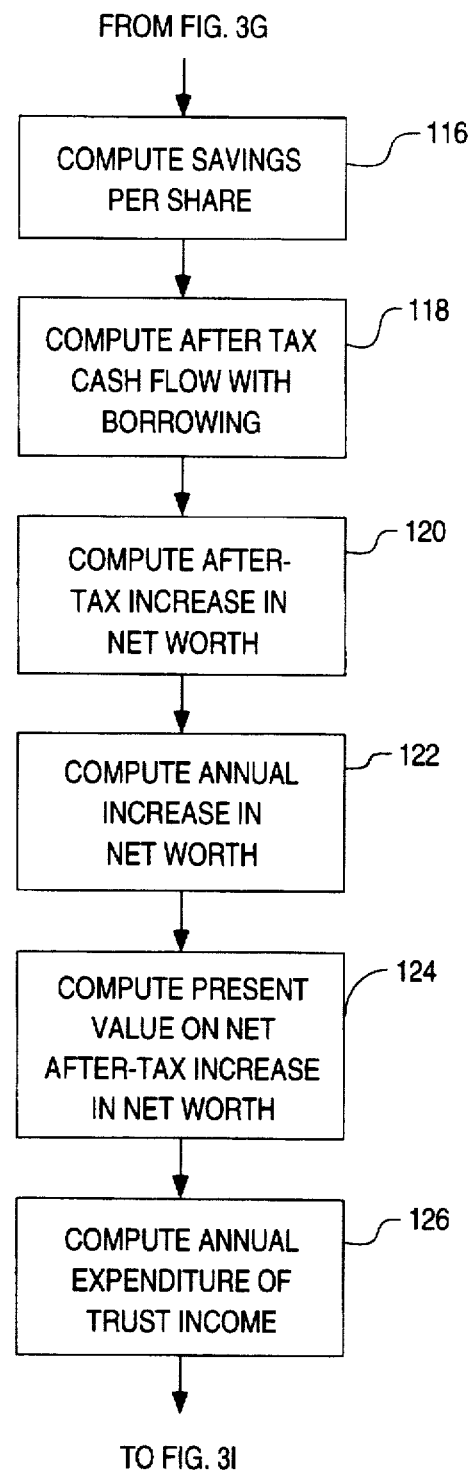
Figure 3I:
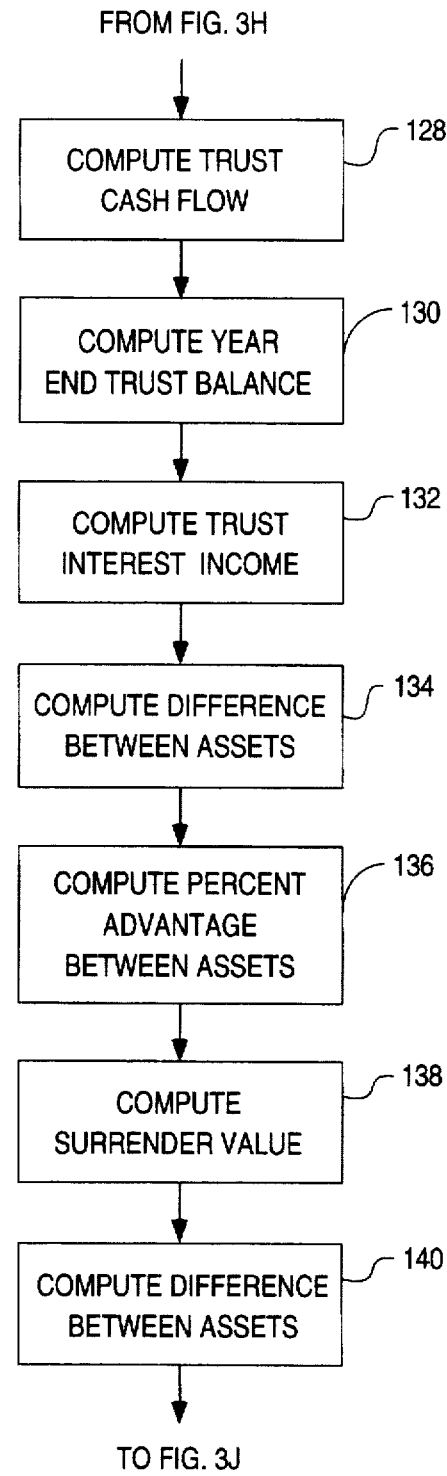
Figure 3J:
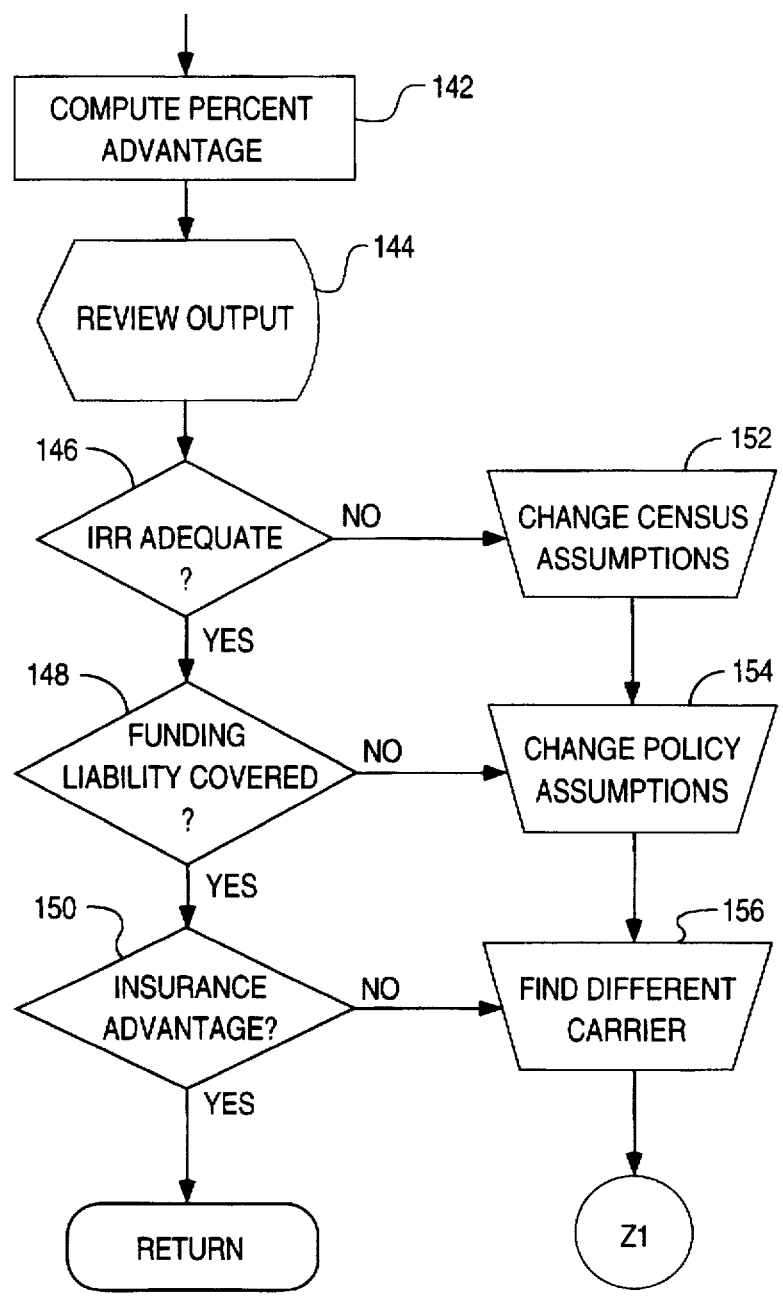

FIGS. 2-3.9 highlight aspects of the logic for Computer Program 13, the details of which can be obtained from the copy of the computer program written through the joint efforts of the inventors herein and attached as an appendix hereto.

FIG. 2 illustrates the logic for a data input function of Computer Program 13. In Blocks 18 and 20, respectively, the annual QAAL and pay-as-you-go costs are retrieved from data files that are provided by the corporation or by an actuarial consulting firm or accounting firm, or from data files that are computed by publicly available software.

A projected insurance premium is calculated by the System 1 in Block 22. The projected insurance premium is equal to the difference between the QAAL, the total amount the corporation may contribute to the VEBA Trust on a tax-deductible basis, and the projected pay-as-you-go cost. The pay-as-you-go cost is the amount that the corporation expects it will have to pay in a given year to cover the costs of providing health care for retirees in that year.

Once the insurance premium is projected, FASB data is retrieved in Block 24. The FASB data is the projected amount of the corporate OPEB expense and liability, assuming Statement 106 is implemented. The liability data, available from the aforementioned software systems or outside providers, is used to compute targets for cash values to be provided by a life insurance carrier. Major life insurance carriers currently offering products to the TOLI market include CIGNA, Metropolitan, Massachusetts Mutual, Hartford, Prudential, Phoenix Mutual, and Travelers. Corporate assumption data is obtained in Block 26. The corporate assumption data includes number of shares outstanding, marginal tax rate, discount rates, estimated long term cost of borrowing, assumed yield on listed assets, alternative minimum tax, years of tax exposure, etc.

Using this information, an illustration request can be sent to the insurance carrier preferably optionally via modem, facsimile, or by letter in Blocks 28 and 30. The illustration request seeks information based on the following:

1) Projected annual premiums. This amount is computed by the system by subtracting the pay-as-you-go cost from the QAAL.
2) Targeted cash value. The system user may instruct the carrier to prepare an illustration in which the cash value of the insurance policy equals the book accrued liability. Because Statement 106 accounting provides that qualified trust assets are a direct offset to the OPEB liability, generating TOLI cash values equal to the OPEB book liability will permit the corporation to remove the OPEB liability from its balance sheet.
3) Targeted cash flows. The system user may instruct the carriers to prepare an illustration in which the annual cash flows from life insurance death benefits and policy surrenders are sufficient to offset the retiree health care pay-as-you-go cash flow. These instructions will indicate a time at which policy cash flows should match pay-as-you-go cash outflows.
4) Earnings rate. This amount is used to determine the cash value earnings rate in the insurance contract and is typically equal to the corporation's long term rate of return on pension investments.
5) Corporate tax rate. This amount, equal to the corporation's combined, federal, state, and local tax rate, is used to determine the after-tax cash surrender value. The after-tax cash surrender value is the value of the life insurance policies assuming the corporation surrenders the policies. In the event of policy surrender, the corporation will owe taxes on the amount by which the policies have appreciated over the invested premiums (less surrenders).
6) Mortality assumptions. Typically provided by the corporation based on the corporation's experience with its pool of corporate employees and pension holders, this data is used to determine frequency of deaths in the insured population.
7) Census data. This information provides the carrier with demographic information as to the age and sex of the corporation's employee population which will be insured by the trust. Where underwriting is required, other demographic data may be supplied (e.g., number of smokers).
8) Reinvestment of death benefits assumption. When a large group of employees is insured, it is actuarially possible to predict with relative accuracy the number of deaths in each year. These deaths provide the trust with death benefits from the insurance contracts. By reinvesting these death benefits in the remaining life insurance covering the surviving employees, the cash value in the insurance policy or policies can grow more rapidly than if death benefits were applied to current pay-as-you-go OPEB costs.

Once an insurance carrier receives this information in the illustration request, it can prepare a life insurance illustration which shows, among other things, an annual stream of death benefits, cash surrender values, and after-tax cash surrender values of a policy given an assumed stream of policy payments. Depending on the life insurance carrier chosen, this policy may be either an individual or group variable life contract. Variable life contracts are preferable because their policies' cash value are invested in separate accounts. Corporations typically prefer such contracts because investment performance of separate account assets is tied to the performance of investment funds, and, further, in the case of carrier insolvency, these funds are free from the claims of creditors under most state insurance laws.

The life insurance carrier illustration is then received either by modem, facsimile, or letter. Data from the illustration is either loaded or manually input into the system at Block 32 for subsequent processing.

When all the data have been entered, the System 1 automatically performs a series of calculations. These calculations convert all of the aforementioned disparate elements of input data into a comprehensible financial output of a summary nature, which can be easily understood by corporate executives and others familiar with the concepts of corporate finance. Samples of the system output are shown in Tables 1–17, beginning with Table 1.

TABLE 1

XYZ CORPORATION
ILLUSTRATION 1
ACTUARIAL AND FINANCIAL ASSUMPTIONS

| CENSUS PROJECTIONS: | |
| --- | --- |
| CENSUS TYPE | CLOSED |
| NUMBER OF RETIREES | 6,384 |
| NUMBER OF ACTIVE EMPLOYEES | 16,803 |
| PERCENTAGE OF RETIREES WITH DEPENDENT COVERAGE | 0.00% |
| ACTUARIAL ASSUMPTIONS: | |
| TERMINATION RATES | COMPANY SUPPLIED |
| DISABILITY RATES | COMPANY SUPPLIED |
| RETIREMENT RATES | 100% AT AGE 69 |
| MORTALITY RATES | 90% OF 83 GAM |
| MEDICAL COST TREND: | |
| YEAR 1 | 15.00% |
| YEAR 2 | 14.00% |
| YEAR 3 | 13.00% |
| YEAR 4 | 12.00% |
| YEAR 5 | 11.00% |
| YEAR 6 | 10.00% |
| YEAR 7 | 9.00% |
| YEAR 8 | 8.00% |
| YEAR 9 | 7.00% |
| YEAR 10 | 6.00% |
| YEAR 11+ | 6.00% |
| INTEREST RATES: | |
| MEDICAL COST DISCOUNT RATE | 9.00% |
| QAAL INTEREST RATE | 7.50% |
| PRE-TAX CORPORATE BORROWING RATE | 10.00% |
| AMORTIZATION PERIODS: | |
| CURRENT RETIREES | 7 YEARS |
| ACTIVE EMPLOYEES | 9 YEARS |

TABLE 1-continued

XYZ CORPORATION
ILLUSTRATION 1
ACTUARIAL AND FINANCIAL ASSUMPTIONS

| TAX RATES: | |
| --- | --- |
| VEBA TAX RATE | 31.00% |
| CORPORATE TAX RATE | 38.00% |
| EARNINGS RATES: | |
| VARIABLE CONTRACT ASSETS NET EARNINGS | 10.00% |
| TAXABLE TRUST ASSETS PRE-TAX EARNINGS | 10.00% |
| DEATH BENEFITS: | REINVESTED DURING PREMIUM PAYING YEARS |
| SFAS #106 PRIOR SERVICE AMORTIZATION PERIOD: | 20 YEARS |
| AVERAGE HEALTH CARE COSTS: | |
| PRE-65 | $4,000 |
| POST-65 | $1,000 |

Table 1 shows key assumptions used by the System 1 in making the calculations for the output. The assumptions start with the census data. This information shows the reader of the output the number of active employees, retirees, percentage of retirees with dependent coverage and the census type used in calculating the output. The census type may be either an open group or a closed group. An open group assumes new lives enter into the population on an annual basis, whereas a closed group assumes no new entrants.

The next series of assumptions includes actuarial assumptions used in developing the inputs. The actuarial assumptions include termination rates, disability rates, retirement rates, and mortality rates. Termination rates are the rates at which members of the employee population leave the employ of a company prior to retirement, due to turnover, termination, or other reasons not relating to disability or retirement. Disability rates are the rates at which various segments of the employee population become disabled and are no longer able to work. Retirement rates are the rates at which various segments of the population retire, by age group. Mortality rates are the number of deaths per 1,000 lives, by age group for the population.

These rates are followed by the medical cost inflation rates assumed by the corporation, its actuary or accountant in making the OPEB cost projections. The medical cost trend is the rate at which retiree medical costs are expected to grow, by year. This is usually based on an analysis of health care cost growth rates at the corporation.

Next, the medical cost discount rate, the Qualified Asset Account Limit (QAAL) interest rate, and the pre-tax corporate borrowing rate are displayed. The medical cost discount rate is the discount rate used in calculating the OPEBs liability. The QAAL interest rate is the discount rate used in calculating the QAAL. The pre-tax corporate borrowing rate is the rate at which the corporation may borrow from banks or the capital markets.

The amortization period used in calculating the QAAL for current retirees and active employees appears next, followed by the VEBA tax rate, corporate tax rate, the earnings rate in the insurance contract and the earnings rate to be used in calculating the taxable trust assets.

Next, assumptions regarding the reinvestment of death benefits are shown, followed by the average pre-65 and post-65 health care costs for the corporate employee population.

The final assumption shown is the assumed amortization period of the OPEBs transition obligation. Under Statement 106, a corporation may elect to recognize the OPEBs costs immediately, in which case the transition obligation is written off in one year. A corporation may also elect to delay recognition of OPEB costs. If a company elects to delay recognition, the transition obligation may be amortized on a straight-line basis over the average remaining service period (the remaining working life) of the active participants. However, if the average remaining service period is less than 20 years, under Statement 106 the employer may elect to use a 20 year amortization period. If most plan participants are already in retirement, then the employer assumes an amortization period equal to the average remaining life expectancy of the participants.

As an example, the XYZ Corporation is assumed to have approximately 6,000 retired employees and 17,000 active employees. Annual health care costs are approximately $4,000 prior to eligibility for Medicare, and $1,000 after Medicare eligibility at age 65. Medical inflation is assumed to be 15 percent in the first year, declining one percentage point per annum, leveling off at 6 percent in year ten, and remaining at six percent thereafter.

The discount rate chosen by XYZ Corporation in calculating the OPEB liability and expense for accounting purposes is 9 percent. For the calculation of the Qualified Asset Account Limit, the discount rate is a more conservative 7.5 percent. Because the QAAL fails to take into account inflation, a number closer to the "real" return on money market instruments is deemed more appropriate for the tax computation.

Table 1 also shows assumptions reflecting XYZ's expectations for long term earnings on future investments in the VEBA Trust. XYZ anticipates long term earnings of 10 percent after fund management fees. The amortization period for transition obligation is assumed to be 20 years.

To provide a better understanding, a list of data input variables for formulas used by Computer Program 13 is set out below. As discussed throughout the text, computed input variables will be distinguished from data input variables by denoting the latter with an asterisk(*). A plus (+) or minus (−) next to a data input variable denotes whether the input item is entered as a positive or negative number:

*$P_t$=Pay-as-you-go cost, year (t) (−)

*$Q_t$=Qualified Asset Account Limit, year (t) (+)

*$EPBO_t$=Expected Postretirement Benefit Obligation under Statement 106, year (t) (+)

*$FE_t$=Statement 106 book expense, year (t) (−)

*$BL_t$=Statement 106 accrued book liability, year (t) (+)

*$PR_t$=Premium, year (t) (−)

*$DB_t$=Death benefit, year (t) (+)

*$CV_t$=Year-end cash value of insurance contract(s), year (t) (+)

*$SV_t$=After-tax year-end surrender value of insurance, contract(s), year (t) (+)

*CT=Corporate tax rate (+)

*VT=VEBA tax rate (+)

*ER=Taxable earnings rate (+)

*LR=Loan interest rate (+)

*DR=Discount rate (+)

*ROP=Return on Plan Assets (+)

*CDR=Cash flow discount rate (+)

*SO=Shares outstanding (+)

*AMT=Alternative minimum tax rate (+)

*AMTY=Number of years AMT in effect (+)

*AMTA=Number of years to amortize AMT paid (+)

*N=Year in which AMT tax begins (+)

The computations made by the System 1, and the formulas and variables used in making them, are shown beginning with FIG. 3.0, block 34 with Compute After-Tax PAYG Cost. The formula for the after-tax pay-as-you-go computation is set out below.

$ATP_t$=After-tax pay-as-you-go cost, year (t)

$ATP_t = *P_t \times (1 - *CT)$

In Compute PAYG Cost Per Share 36, the System 1 converts the after-tax pay-as-you-go cost from absolute dollars into dollars per share as follows:

$ATPS_t$=After-tax pay-as-you-go cost per share, year (t)

$ATPS_t = ATP_t / *SO$

The output from this computation is summarized for XYZ corporation in Table 2.

TABLE 2

XYZ CORPORATION
ILLUSTRATION 1
PAY-AS-YOU-GO RETIREE COST
(000's OMITTED)

| YEAR | ANNUAL RETIREE MEDICAL COST | AFTER-TAX ANNUAL MEDICAL COST (1) | COST PER SHARE ($) (2) |
|---|---|---|---|
| 1 | ($11,394) | ($7,064) | −0.71 |
| 2 | (13,056) | (8,095) | −0.81 |
| 3 | (14,657) | (9,087) | −0.91 |
| 4 | (16,207) | (10,048) | −1.00 |
| 5 | (17,732) | (10,994) | −1.10 |
| 6 | (19,193) | (11,899) | −1.19 |
| 7 | (21,239) | (13,168) | −1.32 |
| 8 | (23,247) | (14,413) | −1.44 |
| 9 | (25,142) | (15,588) | −1.56 |
| 10 | (26,874) | (16,662) | −1.67 |
| 11 | (28,348) | (17,576) | −1.76 |
| 12 | (30,097) | (18,660) | −1.87 |
| 13 | (31,883) | (19,768) | −1.98 |
| 14 | (33,693) | (20,890) | −2.09 |
| 15 | (35,536) | (22,032) | −2.20 |
| 16 | (37,381) | (23,176) | −2.32 |
| 17 | (38,903) | (24,120) | −2.41 |
| 18 | (40,485) | (25,100) | −2.51 |
| 19 | (42,126) | (26,118) | −2.61 |
| 20 | (43,847) | (27,185) | −2.72 |
| 21 | (45,594) | (28,268) | −2.83 |
| 22 | (46,598) | (28,890) | −2.89 |
| 23 | (47,575) | (29,496) | −2.95 |
| 24 | (48,481) | (30,058) | −3.01 |
| 25 | (49,301) | (30,567) | −3.06 |
| 26 | (50,011) | (31,007) | −3.10 |
| 27 | (50,510) | (31,316) | −3.13 |
| 28 | (50,901) | (31,559) | −3.16 |
| 29 | (51,159) | (31,718) | −3.17 |
| 30 | (51,268) | (31,786) | −3.18 |

(1) CORPORATE TAX RATE = 38.0%
(2) SHARES OUTSTANDING = 10,000,000

Table 2 shows the projected annual pay-as-you-go costs expressed in absolute dollars and in dollars per share. The projections shown are based on a closed group of employees, again, meaning that the analysis assumes no new additions to the employee population. However, dynamic projections, showing an open group to which annual additions in the employee population are made, may also be computed by the invention.

The pay-as-you-go cost gradually grows as the bulk of the employee population, assumed to be active initially, is shown to move into retirement. The original pay-as-you-go cost climbs from $11 million in the first year to over $51 million in year 30.

Moving now to Compute After-Tax FASB Medical Expense 38, the System 1 computes the after-tax Statement 106 expense, assuming no funding, as follows:

ATFE$_t$=After-tax Statement 106 expense, year (t)

ATFE$_t$=*FE$_t$×(1-*CT)

At Compute After-Tax FASB Expense 40, the System 1 next converts the after-tax Statement 106 expense into dollars per share:

ATFES$_t$=After-tax Statement 106 expense per share, year (t)

ATFES$_t$=ATFE$_t$/*SO

The output for these computations appears in Table 3.

TABLE 3

XYZ CORPORATION
ILLUSTRATION I
ACCRUED RETIREE COST
(000's OMITTED)

| YEAR | ANNUAL RETIREE MEDICAL EXPENSE | AFTER-TAX ANNUAL MEDICAL EXPENSE (1) | EARNINGS PER SHARE ($) (2) |
|---|---|---|---|
| 1 | ($42,513) | ($26,358) | -2.64 |
| 2 | (44,193) | (27,400) | -2.74 |
| 3 | (45,623) | (28,286) | -2.83 |
| 4 | (47,047) | (29,169) | -2.92 |
| 5 | (48,461) | (30,046) | -3.00 |
| 6 | (49,863) | (30,915) | -3.09 |
| 7 | (51,226) | (31,760) | -3.18 |
| 9 | (52,354) | (32,460) | -3.25 |
| 9 | (53,448) | (33,137) | -3.31 |
| 10 | (54,506) | (33,794) | -3.38 |
| 11 | (55,539) | (34,434) | -3.44 |
| 12 | (56,538) | (35,054) | -3.51 |
| 13 | (57,238) | (35,488) | -3.55 |
| 14 | (57,869) | (35,879) | -3.59 |
| 15 | (58,416) | (36,218) | -3.62 |
| 16 | (58,866) | (36,497) | -3.65 |
| 17 | (59,219) | (36,716) | -3.67 |
| 18 | (59,431) | (36,847) | -3.68 |
| 19 | (59,545) | (36,918) | -3.69 |
| 20 | (59,540) | (36,915) | -3.69 |
| 21 | (47,495) | (29,447) | -2.94 |
| 22 | (47,234) | (29,285) | -2.93 |
| 23 | (46,894) | (29,074) | -2.91 |
| 24 | (46,466) | (28,809) | -2.88 |
| 25 | (45,947) | (28,487) | -2.85 |
| 26 | (45,323) | (28,100) | -2.81 |
| 27 | (44,599) | (27,651) | -2.77 |
| 28 | (43,897) | (27,216) | -2.72 |
| 29 | (43,117) | (26,732) | -2.67 |
| 30 | (42,262) | (26,202) | -2.62 |

(1) CORPORATE TAX RATE = 38.0%
(2) SHARES OUTSTANDING = 10,000,000

Table 3 shows the same stream of benefits as shown in Table 2, this time accounted for on an accrual basis in accordance with Statement 106. Year 1 retiree health care expense changes from $11 million (pay-as-you-go) in Table 2 to nearly $42 million (accrual) in Table 3. Because Statement 106 accelerates the recognition of retiree health care costs, and because, on average, the active population is assumed to be relatively young, retiree health care costs under Statement 106 in Table 3 climb to more than $59 million by year 20 before gradually declining to approximately $42 million in year 30.

The system's output in Tables 2 and 3 permits the corporate client to see that in terms of earnings per share, the impact of Statement 106 is a dramatic increase in the book expense. In the first year, the OPEB expense in earnings per share jumps from 71 cents a share in Table 2 to $2.64 per share in Table 3. In the example set forth in the Table output, the cost under accrued accounting is higher in every year until the 23rd year, when pay-as-you-go costs exceed the Statement 106 costs. If our example were to assume an open group instead of a closed group, accrued expenses would exceed pay-as-you-go costs in all years.

Moving now to Compute Corporate Cash Outlay 42, the System 1 computes the corporate before-tax cash outlay assuming an investment in an insurance product owned by the VEBA Trust with the following formulas:

CO$_t$=Corporate cash outlay, year (t)

CO$_t$=lesser of 0 or (*PR$_t$+*P$_t$+*DB$_t$)

In Compute Annual Tax Savings 44, the System 1 computes the annual tax savings resulting from funding a VEBA using insurance by means of the equation set forth below.

TS$_t$ = Tax savings, year (t)

$$TS_t = \begin{cases} {}^*Q_t \times {}^*CT, \text{ if } -CO_t \geq {}^*Q_t \\ \text{lesser of: otherwise,} \begin{cases} {}^*Q_t \times {}^*CT, \text{ or} \\ \text{greater of:} \begin{cases} 0, \text{ or} \\ \sum_{r=1}^{t} (-CO_r \times {}^*CT) - \sum_{r=1}^{t-1} TS_r \end{cases} \end{cases} \end{cases}$$

In Branch 45, AMT Tax Payer?, the user will test whether an alternative minimum tax (AMT) is applicable. This information is normally provided by the corporation for which the financial analysis is being conducted. If the answer is yes, in Compute AMT Tax Effect 46 the user goes to a separate spread sheet and computes the AMT tax effect resulting from funding a VEBA using AMTE$_t$ = AMT tax effect, year (t)

$$AMTE_t = \begin{cases} ({}^*CT - {}^*AMT) \times - {}^*Q_t, \text{ if } {}^*AMTY \geq t - N + 1 \\ 0, \text{ otherwise} \end{cases}$$

insurance:

Then at Compute AMT Amortization Schedule 47, the user computes the AMT amortization schedule:

AMTAS$_t$ = AMT amortization schedule, year (t)

$$AMTAS_t = \begin{cases} \sum_{r=1}^{t} \frac{-AMTE_r}{{}^*AMTA}, \text{ if } ({}^*N + {}^*AMTY) < t \leq ({}^*N + {}^*AMTY + {}^*AMTA) \\ 0, \text{ otherwise} \end{cases}$$

Moving now to FIG. 3.1, the logic of System 1 moves to Compute After-Tax Cash Flow with Insurance 48, where the System 1 computes the after-tax cash flow with the investment in insurance:

CFI$_t$=After-tax cash flow with insurance, year (t)

CFI$_t$=CO$_t$+TS$_t$+AMTE$_t$+AMTAS$_t$

Note: If there is no AMT then AMTE$_t$ and AMTAS$_t$=0 for all years.)

The output from the computations in Blocks 42–48 is summarized in Table 4.

TABLE 4

XYZ CORPORATION
ILLUSTRATION I
CASH FLOW ANALYSIS
(000's OMITTED)

| YEAR | ANNUAL RETIREE MEDICAL COST | VEBA TRUST INVESTMENT | ESTIMATED DEATH BENEFITS DISTRIBUTED | CORPORATE CASH OUTLAY (1) | ANNUAL QUALIFIED ASSET ACCOUNT FUNDING LIMIT | ANNUAL TAX SAVINGS (2) | AFTER-TAX CASH FLOW WITH TRUST (3) |
|---|---|---|---|---|---|---|---|
| 1 | ($11,394) | ($10,001) | $ 0 | ($21,395) | $21,395 | $ 8,130 | ($13,265) |
| 2 | (13,056) | (10,560) | 0 | (23,617) | 23,617 | 8,974 | (14,642) |
| 3 | (14,657) | (12,000) | 0 | (26,657) | 26,657 | 10,130 | (16,527) |
| 4 | (16,207) | (13,862) | 0 | (30,068) | 30,068 | 11,426 | (18,642) |
| 5 | (17,732) | (16,790) | 0 | (34,522) | 34,522 | 13,118 | (21,404) |
| 6 | (19,193) | (21,201) | 6 | (40,394) | 40,394 | 15,350 | (25,044) |
| 7 | (21,239) | (22,272) | 0 | (43,511) | 52,279 | 16,534 | (26,977) |
| 8 | (23,247) | (10,264) | 0 | (33,510) | 33,510 | 12,734 | (20,777) |
| 9 | (25,142) | (15,326) | 0 | (40,468) | 40,468 | 15,378 | (25,090) |
| 10 | (26,874) | 0 | 7,509 | (19,365) | 15,701 | 5,967 | (13,399) |
| 11 | (28,348) | 0 | 8,260 | (20,089) | 14,971 | 5,689 | (14,400) |
| 12 | (30,097) | 0 | 9,042 | (21,055) | 16,069 | 6,106 | (14,949) |
| 13 | (31,883) | 0 | 9,854 | (22,029) | 17,402 | 6,613 | (15,416) |
| 14 | (33,693) | 0 | 10,696 | (22,997) | 19,154 | 7,279 | (15,718) |
| 15 | (35,536) | 0 | 11,569 | (23,967) | 20,898 | 7,941 | (16,026) |
| 16 | (37,381) | 0 | 12,473 | (24,907) | 22,369 | 8,500 | (16,407) |
| 17 | (38,903) | 0 | 13,423 | (25,480) | 21,558 | 8,192 | (17,288) |
| 18 | (40,485) | 0 | 14,404 | (26,080) | 23,112 | 8,783 | (17,298) |
| 19 | (42,126) | 0 | 15,413 | (26,714) | 24,882 | 9,455 | (17,259) |
| 20 | (43,847) | 0 | 16,452 | (27,394) | 26,639 | 10,123 | (17,272) |
| 21 | (45,594) | 0 | 17,497 | (28,098) | 28,073 | 10,668 | (17,430) |
| 22 | (46,598) | 0 | 18,530 | (28,068) | 25,249 | 9,595 | (18,473) |
| 23 | (47,575) | 0 | 19,552 | (28,023) | 26,221 | 9,964 | (18,059) |
| 24 | (48,481) | 0 | 20,567 | (27,914) | 27,347 | 10,392 | (17,522) |
| 25 | (49,301) | 0 | 21,615 | (27,686) | 28,385 | 10,786 | (16,899) |
| 26 | (50,011) | 0 | 22,672 | (27,339) | 29,235 | 11,109 | (16,229) |
| 27 | (50,510) | 0 | 23,729 | (26,781) | 29,522 | 11,218 | (15,563) |
| 28 | (50,901) | 0 | 24,817 | (26,084) | 30,180 | 11,469 | (14,616) |
| 29 | (51,159) | 0 | 25,944 | (25,215) | 30,750 | 11,685 | (13,530) |
| 30 | (51,268) | 0 | 27,123 | (24,144) | 31,174 | 11,846 | (12,298) |

(1) CORPORATE CASH OUTLAY EQUATE ANNUAL RETIREE EXPENSE PLUS ANNUAL PREMIUM PLUS DEATH BENEFITS. CORPORATE CASH OUTLAY MUST ALWAYS BE LESS THAN OR EQUAL TO ZERO.
(2) CORPORATE TAX RATE = 38.0% QAAL USED AS BASIS OF MAXIMUM TAX SAVINGS. GROSS CASH OUTLAYS IN EXCESS OF QAAL CARRY FORWARD FOR CREDIT IN UNDERFUNDED YEARS.
(3) AFTER-TAX CASH FLOW EQUALS CORPORATE CASH OUTLAY TOSS TAX SAVINGS.

In this example for XYZ Corporation, there is no AMT. Table 4 shows the amount the corporation may contribute to the VEBA in each year, and the allocation of funds in the VEBA. Of the total amount that the corporation may contribute in year one on a tax deductible basis, $21.4 million, the Table 4 shows that System 1 has computed that $11.4 million must be applied to current retiree costs. The additional $10 million is dedicated to funding for future OPEB costs and is used to purchase life insurance contracts. The total after-tax cost for retiree health care calculated by the System 1 for Year 1 is $13.3 million. To maximize asset accumulation within the VEBA trust, the System 1 user has requested the insurance carrier to show projected death proceeds from the life insurance contracts being reinvested each year in those life insurance contracts remaining in the trust. This can be seen by the "zero death benefits" appearing during the first nine years of the computation of Estimated Death Benefits column of Table 4.

In Compute Accumulation of Cash Reserves 50, the System 1 computes the accumulation of cash reserves within the Trust. This amount is equal to the amount of money which has not been invested in life insurance:

$ACR_t$=Accumulation of Cash Reserves, year (t)

$ACR_t = ACR_{t-1} \times (1+{*}ER) + \max(0, P_t + DB_t) \times (1+{*}ER)^{0.5}$ In Block 52, Compute Year-End Cash Value of Trust, the System 1 computes the year end cash value of the life insurance policy (or policies) owned by the VEBA trust:

$YVT_t$=Year end cash value of trust, year (t)

$YVT_t = {*}CV_t + ACR_t$

Next, in Compute Yearly Cash Build-Up on Investment 54, the System 1 computes the yearly cash buildup on investments made by the VEBA Trust:

$YBI_t$=Yearly buildup on investment, year (t)

$YBI_t = YVT_t - YVT_{t-1} + {*}PR_t$ (Note: $YVT_0 = 0$.)

In Compute Death Benefits Distributed 56, the System 1 computes the death benefits distributed from the life insurance policy(ies) to the VEBA Trust:

$DBD_t$=Death Benefits Distributed, year (t)

$DBD_t$=lesser of $-{*}P_t$ or ${*}DB_t$

In Compute VEBA Trust Book Income 58, the System 1 Computes the book income earned by the VEBA Trust:

$VTBI_t$=VEBA Trust Book Income, year (t)

$$VTBI_t = YBI_t + DBD_t$$

Continuing with FIG. 3.2, in the following five blocks, Compute Estimated Income from Trust 60 through Compute Earnings from Trust 68, the System 1 computes the income that the Corporation may recognize from its investment in the VEBA Trust. Because FAS 106 allows the Corporation to use estimated average rates of return on the income it declares, the earnings computed in block 68 may differ from the income computed in block 58.

In Block 60 the System 1 computes:

$ETI_t$=Estimated Trust Income, year (t)

$$ETI_t = (YVT_{t-1} - PR_t) \times ROP$$

In Block 62 the System 1 computes the annual difference between the Estimated Trust Income 60 and the actual VEBA Trust Book Income 58:

$ADI_t$=Annual Difference in Income, year (t)

$$ADI_t = ETI_t - VTBI_t$$

In Block 64 the System 1 computes the cumulative difference between the the Estimated Trust Income 60 and the actual VEBA Trust Book Income 58:

$CDI_t$=Cumulative Difference, year (t)

$$CDI_t = CDI_{t-1} - AMD_{t-1} + ADI_t$$

(Note: $CDI_0=0$; $AMD_0=0$)

In Block 66 The System 1 computes the yearly amortization of the difference between the Estimated Trust Income 60 and the actual VEBA Trust Book Income 58. A five year amortization is used by the system in a preferred emodiment because it is the longest period allowed for straight-line amortization under FAS 106. (However, shorter amortization periods and different amortization methods may also be used if desired):

$AMD_t$=Amortization of Difference in Income, year (t)

$$AMD_t = CDI_t/5$$

Finally, the System 1 computes corporate earnings from the trust in Block 68 as follows:

$CET_t$=Corporate Earnings from Trust, year (t)

$$CET_t = ETI_t - AMD_t$$

Thus the computation of the Corporate Earnings from Trust 68, reflects the Estimated Trust Income 60, as well as an amortized portion of the cumulative difference between the previous estimated and the previous actual incomes. The output from the computations in Blocks 48–68 show in Table 5 that prefunding using TOLI results in rapid accumulation of assets in the VEBA Trust.

TABLE 5

XYZ CORPORATION
ILLUSTRATION I
EARNINGS AMOUNT
(000's OMITTED)

| YEAR | YEAR END CONTRACT CASH VALUE | ACCUM. OF CASH RESERVES (1) | YEAR-END CASH VALUE OF TRUST (2) | VEBA TRUST INVEST. | ANNUAL INVEST. GROWTH | DEATH BENEFITS DISTRIB. | VEBA TRUST BOOK INCOME | CORPORATE EARNINGS FROM TRUST (3) |
|---|---|---|---|---|---|---|---|---|
| 1 | $10,069 | 0 | $10,069 | ($10,001) | $68 | $0 | $68 | $925 |
| 2 | 21,702 | 0 | 21,702 | (10,560) | 1,073 | 0 | 1,073 | 1,737 |
| 3 | 35,983 | 0 | 35,983 | (12,000) | 2,281 | 0 | 2,281 | 2,813 |
| 4 | 53,659 | 0 | 53,659 | (13,862) | 3,814 | 0 | 3,814 | 4,200 |
| 5 | 76,273 | 0 | 76,273 | (16,790) | 5,823 | 0 | 5,823 | 6,029 |
| 6 | 105,802 | 0 | 105,802 | (21,201) | 8,328 | 0 | 8,328 | 8,487 |
| 7 | 139,354 | 0 | 139,354 | (22,272) | 11,281 | 0 | 11,281 | 11,286 |
| 8 | 163,492 | 0 | 163,492 | (10,264) | 13,874 | 0 | 13,874 | 13,278 |
| 9 | 195,339 | 0 | 195,339 | (15,326) | 16,521 | 0 | 16,521 | 16,098 |
| 10 | 206,430 | 0 | 206,430 | 0 | 11,091 | 7,509 | 18,600 | 17,711 |
| 11 | 217,822 | 0 | 217,822 | 0 | 11,392 | 8,260 | 19,651 | 18,915 |
| 12 | 229,512 | 0 | 229,512 | 0 | 11,690 | 9,042 | 20,732 | 20,116 |
| 13 | 241,498 | 0 | 241,498 | 0 | 11,986 | 9,854 | 21,840 | 21,320 |
| 14 | 253,778 | 0 | 253,778 | 0 | 12,280 | 10,696 | 22,977 | 22,533 |
| 15 | 266,350 | 0 | 266,350 | 0 | 12,572 | 11,569 | 24,141 | 23,757 |
| 16 | 279,210 | 0 | 279,210 | 0 | 12,860 | 12,473 | 25,333 | 24,997 |
| 17 | 292,338 | 0 | 292,338 | 0 | 13,128 | 13,423 | 26,551 | 26,254 |
| 18 | 305,728 | 0 | 305,728 | 0 | 13,390 | 14,404 | 27,795 | 27,528 |
| 19 | 319,379 | 0 | 319,379 | 0 | 13,651 | 15,413 | 29,063 | 28,820 |
| 20 | 333,284 | 0 | 333,284 | 0 | 13,904 | 16,452 | 30,357 | 30,131 |
| 21 | 347,462 | 0 | 347,462 | 0 | 14,179 | 17,497 | 31,675 | 31,462 |
| 22 | 361,955 | 0 | 361,955 | 0 | 14,493 | 18,530 | 33,023 | 32,816 |
| 23 | 376,807 | 0 | 376,807 | 0 | 14,852 | 19,552 | 34,403 | 34,198 |
| 24 | 392,069 | 0 | 392,069 | 0 | 15,262 | 20,567 | 35,828 | 35,613 |
| 25 | 407,754 | 0 | 407,754 | 0 | 15,685 | 21,615 | 37,300 | 37,068 |
| 26 | 423,896 | 0 | 423,896 | 0 | 16,142 | 22,672 | 38,814 | 38,565 |
| 27 | 440,541 | 0 | 440,541 | 0 | 16,645 | 23,729 | 40,375 | 40,108 |

TABLE 5-continued

XYZ CORPORATION
ILLUSTRATION I
EARNINGS AMOUNT
(000's OMITTED)

| YEAR | YEAR END CONTRACT CASH VALUE | ACCUM. OF CASH RESERVES (1) | YEAR-END CASH VALUE OF TRUST (2) | VEBA TRUST INVEST. | AN-NUAL INVEST. GROWTH | DEATH BENEFITS DISTRIB. | VEBA TRUST BOOK INCOME | CORPORATE EARNINGS FROM TRUST (3) |
|---|---|---|---|---|---|---|---|---|
| 28 | 457,709 | 0 | 457,709 | 0 | 17,167 | 24,817 | 41,984 | 40,162 |
| 29 | 475,409 | 0 | 475,409 | 0 | 17,700 | 25,944 | 43,644 | 42,066 |
| 30 | 493,640 | 0 | 493,640 | 0 | 18,231 | 27,123 | 45,355 | 43,969 |

(1) CASH RESERVE ACCUMULATED FROM DEATH BENEFITS (MID-YEAR) THAT EXCEED ANNUAL RETIREE MEDICAL EXPENSES (MID-YEAR). RESERVES INVESTED IN TAXABLE VEGA INVESTMENTS.
TRUST INTEREST RATE = 10.00%
VEBA TAX RATE = 31.00%
(2) YEAR-END CASH VALUE OF TRUST EQUALS CONTRACT CASH VALUE PLUS ACCUMULATED RESERVES.
(3) COMPUTATION MADE PURSUANT TO PARAGRAPH 57 OF STATEMENT 106. ASSUMPTIONS ARE THAT INCOME DIFFERENCES ARE AMORTIZED STRAIGHT LINE OVER FIVE YEARS AND MARKET RELATED VALUE OF PLAN ASSETS EQUALS FAIR MARKET VALUE.

In the example shown in Table 5, the annual cash accumulation rate increases from $68 thousand in the first year of the projections to more than $18 million in year 30. Corporate Earnings from the Trust grow in a similar pattern, but in Corporate Earnings, year-to-year swings in actual income, due to variations in commissions and mortality charges, are smoothed through the use of an estimated average rate. Corporate financial officers like to provide investors with stable earnings. According to modern financial theory, the more stable the earnings record of a company, all other things being equal, the lower its cost of capital. This stablized Corporate income will be used to offset increased book costs from Statement 106 expense accruals.

In Compute Net Book Liability 70, the System 1 computes the net book liability of the corporation assuming it used a VEBA trust to prefund its retiree health care benefit costs:

$NBL_t$=Annual net book liability, year (t)

$NBL_t$=$BL_t$-$YVT_t$

The output from the computations in Block 70 are used in constructing Table 6.

TABLE 6

XYZ CORPORATION
ILLUSTRATION I
RETIREE HEALTH COST LIABILITY OFFSET
(000's OMITTED)

| YEAR | YEAR END CASH VALUE OF TRUST | BOOK ACCRUED LIABILITY | MET LOOK LIABILITY |
|---|---|---|---|
| 1 | $10,069 | $31,119 | $21,050 |
| 2 | 21,702 | 62,255 | 40,553 |
| 3 | 35,983 | 93,221 | 57,237 |
| 4 | 53,659 | 124,061 | 70,401 |
| 5 | 76,273 | 154,790 | 78,517 |
| 6 | 105,802 | 185,460 | 79,658 |
| 7 | 139,354 | 215,447 | 76,092 |
| 8 | 163,492 | 244,554 | 81,062 |
| 9 | 195,339 | 272,859 | 77,520 |
| 10 | 206,430 | 300,492 | 94,062 |
| 11 | 217,822 | 327,683 | 109,861 |

TABLE 6-continued

XYZ CORPORATION
ILLUSTRATION I
RETIREE HEALTH COST LIABILITY OFFSET
(000's OMITTED)

| YEAR | YEAR END CASH VALUE OF TRUST | BOOK ACCRUED LIABILITY | MET LOOK LIABILITY |
|---|---|---|---|
| 12 | 229,512 | 354,124 | 124,612 |
| 13 | 241,498 | 379,479 | 137,981 |
| 14 | 253,778 | 403,655 | 149,877 |
| 15 | 266,350 | 426,535 | 160,185 |
| 16 | 279,210 | 448,020 | 168,810 |
| 17 | 292,338 | 468,336 | 175,998 |
| 18 | 305,728 | 487,282 | 181,554 |
| 19 | 319,379 | 504,701 | 185,321 |
| 20 | 333,284 | 520,394 | 187,111 |
| 21 | 347,462 | 522,295 | 174,833 |
| 22 | 361,955 | 522,931 | 160,976 |
| 23 | 376,807 | 522,250 | 145,443 |
| 24 | 392,069 | 520,236 | 128,167 |
| 25 | 407,754 | 516,882 | 109,128 |
| 26 | 423,896 | 512,193 | 88,297 |
| 27 | 440,541 | 506,292 | 65,741 |
| 28 | 457,709 | 499,278 | 41,570 |
| 29 | 475,409 | 491,237 | 15,828 |
| 30 | 493,640 | 482,231 | (11,409) |

Table 6 shows the accumulation of TOLI assets over time and compares them to the accrued book liability for OPEBs in each year. This example assumes a closed employee group and earnings in the life insurance contracts of ten percent after fund management fees, and its output shows that the Trust achieves full funding by the end of Year 30. This comparison is an important piece of information for anyone evaluating prefunding because it shows how rapidly a corporation may eliminate the Statement 106 OPEB liability from its balance sheet. (Corporations seek to eliminate this obligation from their balance sheet, and thereby reduce their debt to equity ratio; also, many corporations have loan covenants limiting the amount they can borrow as a percentage of shareholder's equity.) In the absence of this comparison, it would be all but impossible for a corporate decision-maker to determine the extent and timing of this liability offset.

Continuing with FIG. 3.3, in Compute Income Before Taxes 72, the System 1 computes the book income before taxes resulting from the TOLI investment:

$IBT_t$=Income before taxes, year (t)

$$IBT_t = CET_t + P_t$$

At Compute Annual Tax Benefit 74, the System 1 computes the annual book tax benefit resulting from tax-deductible corporate contributions to the VEBA Trust:

TABLE 7

XYZ CORPORATION
ILLUSTRATION I
ANNUAL INCOME STATEMENT EFFECT
(000's OMITTED)

| YEAR | CORPORATE EARNINGS FROM TRUST | ANNUAL RETIREE MEDICAL EXPENSE | INCOME EFFECT BEFORE TAXES (1) | ANNUAL TAX BENEFIT (2) | NET P & L EFFECT WITH TRUST | EARNINGS PER SHARE ($) (3) |
|---|---|---|---|---|---|---|
| 1 | 925 | ($42,513) | (41,587) | $15,803 | ($25,784) | −2.58 |
| 2 | 1,737 | (44,193) | (42,456) | 16,133 | (26,323) | −2.63 |
| 3 | 2,813 | (45,623) | (42,809) | 16,268 | (26,542) | −2.65 |
| 4 | 4,200 | (47,047) | (42,847) | 16,282 | (26,565) | −2.66 |
| 5 | 6,029 | (48,461) | (42,432) | 16,124 | (26,308) | −2.63 |
| 6 | 8,487 | (49,863) | (41,376) | 15,723 | (25,653) | −2.57 |
| 7 | 11,286 | (51,226) | (39,940) | 15,177 | (24,763) | −2.48 |
| 8 | 13,278 | (52,354) | (39,076) | 14,849 | (24,227) | −2.42 |
| 9 | 16,098 | (53,448) | (37,349) | 14,193 | (23,157) | −2.32 |
| 10 | 17,711 | (54,506) | (36,796) | 13,982 | (22,813) | −2.28 |
| 11 | 18,915 | (55,539) | (36,625) | 13,917 | (22,707) | −2.27 |
| 12 | 20,116 | (56,538) | (36,423) | 13,841 | (22,582) | −2.26 |
| 13 | 21,320 | (57,238) | (35,918) | 13,649 | (22,269) | −2.23 |
| 14 | 22,533 | (57,869) | (35,336) | 13,428 | (21,908) | −2.19 |
| 15 | 23,757 | (58,416) | (34,658) | 13,170 | (21,488) | −2.15 |
| 16 | 24,997 | (58,866) | (33,869) | 12,870 | (20,999) | −2.10 |
| 17 | 26,254 | (59,219) | (32,965) | 12,527 | (20,438) | −2.04 |
| 18 | 27,528 | (59,431) | (31,904) | 12,123 | (19,780) | −1.98 |
| 19 | 28,820 | (59,545) | (30,725) | 11,676 | (19,050) | −1.90 |
| 20 | 30,131 | (59,540) | (29,409) | 11,175 | (18,234) | −1.82 |
| 21 | 31,462 | (47,495) | (16,033) | 6,092 | (9,940) | −0.99 |
| 22 | 32,816 | (47,234) | (14,418) | 5,479 | (8,939) | −0.89 |
| 23 | 34,198 | (46,894) | (12,696) | 4,824 | (7,871) | −0.79 |
| 24 | 35,613 | (46,466) | (10,853) | 4,124 | (6,729) | −0.67 |
| 25 | 37,068 | (45,947) | (8,879) | 3,374 | (5,505) | −0.55 |
| 26 | 38,565 | (45,323) | (6,758) | 2,568 | (4,190) | −0.42 |
| 27 | 40,108 | (44,599) | (4,491) | 1,707 | (2,784) | −0.28 |
| 28 | 40,162 | (43,897) | (3,736) | 1,420 | (2,316) | −0.23 |
| 29 | 42,066 | (43,117) | (1,051) | 399 | (652) | −0.07 |
| 30 | 43,969 | (42,262) | 1,708 | (649) | 1,059 | 0.11 |

(1) NET INCOME BEFORE TAXES EQUALS TRUST BOOK INCOME MINUS ANNUAL RETIREE MEDICAL EXPENSE.
(2) ACCRUED TAX BENEFIT FROM NET BOOK EXPENSE. CORPORATE TAX RATE = 38.0%
(3) SHARES OUTSTANDING = 10,000,000

$TB_t$=Tax benefit, year (t)

$$TB_t = -IBT_t \times CT$$

In Compute Profit and Loss Effect 76, the System 1 computes the profit and loss effect of the prefunding transaction as it might contribute to profit and loss on the corporation's annual Income Statement:

$PL_t$=Profit and loss effect, year (t)

$$PL_t = IBT_t + TB_t$$

Then, at Block 78, Compute Earnings Per Share, the System 1 converts the book income calculated above into earnings per share:

$EPS_t$=Earnings per share, year (t)

$$EPS_t = PL_t / SO$$

Table 7 shows the values computed in Blocks 72–78.

This analysis, in particular, permits the user to show a corporate customer why prefunding is so attractive from an earnings stand-point. As the output in Table 7 shows, under Statement 106 accounting rules, both death proceeds and increases in cash value are recognized as current income without a tax burden. This income is included as an offset to the annual retiree medical expense accrual.

At Compute Savings 80, the System 1 computes the per share savings that results from prefunding using TOLI in funding a VEBA trust:

$S_t$=Savings from prefunding, year (t)

$$S_t = PL_t - ATFE_t$$

At Compute Savings Per Share 82, the System 1 computes the savings per share from using insurance in funding a VEBA trust:

$SPS_t$=Savings per share from prefunding, year (t)

$$SPS_t = S_t / SO$$

The information computed in Blocks 80 and 82 allows a corporate decision-maker to quantify in earnings per share terms the benefits of prefunding with TOLI. An example of the output is shown as Table 8.

TABLE 8

XYZ CORPORATION
ILLUSTRATION I
ANNUAL SAVINGS PER SHARE EFFECT
(000's OMITTED)

| YEAR | NET P & L EFFECT WITH TRUST | NET P & L EFFECT WITHOUT TRUST | SAVINGS | SAVINGS PER SHARE ($) (1) |
|---|---|---|---|---|
| 1 | ($25,784) | ($26,358) | $574 | 0.06 |
| 2 | (26,323) | (27,400) | 1,077 | 0.11 |
| 3 | (26,542) | (28,286) | 1,744 | 0.17 |
| 4 | (26,565) | (29,169) | 2,604 | 0.26 |
| 5 | (26,308) | (30,046) | 3,738 | 0.37 |
| 6 | (25,653) | (30,915) | 5,262 | 0.53 |
| 7 | (24,763) | (31,760) | 6,997 | 0.70 |
| 8 | (24,227) | (32,460) | 8,232 | 0.82 |
| 9 | (23,157) | (33,137) | 9,981 | 1.00 |
| 10 | (22,813) | (33,794) | 10,981 | 1.10 |
| 11 | (22,707) | (34,434) | 11,727 | 1.17 |
| 12 | (22,582) | (35,054) | 12,472 | 1.25 |
| 13 | (22,269) | (35,488) | 13,219 | 1.32 |
| 14 | (21,908) | (35,879) | 13,970 | 1.40 |
| 15 | (21,488) | (36,218) | 14,730 | 1.47 |
| 16 | (20,999) | (36,497) | 15,498 | 1.55 |
| 17 | (20,438) | (36,716) | 16,277 | 1.63 |
| 18 | (19,780) | (36,847) | 17,067 | 1.71 |
| 19 | (19,050) | (36,918) | 17,868 | 1.79 |
| 20 | (18,234) | (36,915) | 18,681 | 1.87 |
| 21 | (9,940) | (29,447) | 19,507 | 1.95 |
| 22 | (8,939) | (29,285) | 20,346 | 2.03 |
| 23 | (7,871) | (29,074) | 21,203 | 2.12 |
| 24 | (6,729) | (28,809) | 22,080 | 2.21 |
| 25 | (5,505) | (28,487) | 22,982 | 2.30 |
| 26 | (4,190) | (28,100) | 23,910 | 2.39 |
| 27 | (2,734) | (27,651) | 24,867 | 2.49 |
| 28 | (2,316) | (27,216) | 24,900 | 2.49 |
| 29 | (652) | (26,732) | 26,081 | 2.61 |
| 30 | 1,708 | (26,202) | 27,910 | 2.79 |

(1) SHARES OUTSTANDING = 10,000,000

Table 8 shows that a substantial benefit inures from prefunding with TOLI. This benefit increases annually from six cents per share in the first year to $2.79 per share in the thirtieth year.

FIG. 3.4 begins with Compute Deferred Debit No Funding 84, in which the System 1 computes the debit to deferred income taxes that is generated when the OPEB liability is accrued without the benefit of reduced (cash) taxes:

$DDN_t$ = Deferred Debit No Funding, year (t)

$$DDN_t = \begin{cases} (*BL_t - *BL_{t-1}) \times *CT, & \text{if } \sum_{x=1}^{t-1} DDN_x + (*BL_t - *BL_{t-1}) \times *CT \geq 0 \\ -\sum_{x=1}^{t-1} DDN_x, & \text{if } \sum_{x=1}^{t-1} DDN_x > 0 \\ 0, & \text{otherwise} \end{cases}$$

Next, in Compute Liability Accrued with Funding 86, the System 1 computes the yearly income tax savings that are accrued by a corporation that funds a VEBA Trust to offset the accruing OPEB liabilities:

$LAW_t$=Liability Accrued with Funding, year (t)

$LAW_t=(NBL_t-NBL_{t-1}) \times *CT$

In Compute Cumulative Liability with Funding 88, the System 1 computes the cumulative sum of yearly Liabilites Accrued with Funding (Block 86):

$CLW_t$ = Cumulative Liability with Funding, year (t)

$$CLW_t = \sum_{x=1}^{t} LAW_x$$

In Compute Deferred Debit with Funding 90, the System 1 computes the debit to deferred income taxes that is generated when a corporation funds a VEBA Trust to offset the its accruing OPEB liabilities:

$DDW_t$ = Deferred Debit with Funding, year (t)

$$DDW_t = \begin{cases} LAW_t & \text{if } CLW_t > 0 \\ -CLW_{t-1} & \text{if } CLW_t \leq 0 \text{ and } CLW_{t-1} > 0 \\ 0 & \text{otherwise} \end{cases}$$

In Compute Reduction in Deferred Debit 92, the System 1 computes the annual reduction in the debit to deferred income taxes due to funding of the VEBA Trust:

$RDD_t$=Reduction in Deferred Debit, year (t)

$RDD_t=DDN_t-DDW_t$

Finally, FIG. 3.4 ends with Compute Cumulative Reduction in Debit 94, in which the System 1 computes the cumulative effect of the reductions in the debits to deferred income taxes due to funding of the VEBA Trust:

$CRD_t$=Cumulative Reduction in Debit, year (t)

$CRD_t=CRD_{t-1}+RDD_t$ (Note $CRD_0$=0)

The output of the computations of Blocks 84–94, show in Table 9 that funding a VEBA Trust significantly reduces the deferred-tax debits that grow from the accrual of the OPEB liability.

TABLE 9

XYZ CORPORATION
ILLUSTRATION I
DEFERRED TAX ANALYSIS
(000's OMITTED)

| YEAR | DEFERRED TAX DEBIT WITHOUT FUNDING (1) | DEFERRED TAX DEBIT WITH FUNDING | REDUCTION IN DEFERRED TAX DEBIT | CUMULATIVE REDUCTION IN DEFERRED TAX DEBITS |
|---|---|---|---|---|
| 1 | $11,825 | $7,999 | $3,826 | $3,826 |
| 2 | 11,832 | 7,411 | 4,421 | 8,247 |
| 3 | 11,767 | 6,340 | 5,427 | 13,674 |
| 4 | 11,719 | 5,002 | 6,717 | 20,390 |
| 5 | 11,677 | 3,084 | 8,593 | 28,984 |
| 6 | 11,655 | 434 | 11,221 | 40,205 |
| 7 | 11,395 | (1,355) | 12,750 | 52,955 |
| 8 | 11,061 | 1,888 | 9,172 | 62,127 |
| 9 | 10,756 | (1,346) | 12,102 | 74,229 |
| 10 | 10,500 | 6,286 | 4,215 | 78,443 |
| 11 | 10,333 | 6,004 | 4,329 | 82,772 |
| 12 | 10,048 | 5,605 | 4,442 | 87,215 |
| 13 | 9,635 | 5,080 | 4,555 | 91,769 |
| 14 | 9,187 | 4,520 | 4,667 | 96,436 |
| 15 | 8,694 | 3,917 | 4,777 | 101,213 |
| 16 | 8,164 | 3,278 | 4,887 | 106,100 |

TABLE 9-continued

XYZ CORPORATION
ILLUSTRATION I
DEFERRED TAX ANALYSIS
(000's OMITTED)

| YEAR | DEFERRED TAX DEBIT WITHOUT FUNDING (1) | DEFERRED TAX DEBIT WITH FUNDING | REDUCTION IN DEFERRED TAX DEBIT | CUMULATIVE REDUCTION IN DEFERRED TAX DEBITS |
|---|---|---|---|---|
| 17 | 7,720 | 2,731 | 4,989 | 111,088 |
| 18 | 7,200 | 2,111 | 5,088 | 116,177 |
| 19 | 6,619 | 1,432 | 5,187 | 121,364 |
| 20 | 5,964 | 680 | 5,284 | 126,648 |
| 21 | 722 | (4,666) | 5,388 | 132,036 |
| 22 | 242 | (5,265) | 5,507 | 137,543 |
| 23 | (259) | (5,902) | 5,644 | 143,187 |
| 24 | (766) | (6,565) | 5,799 | 148,986 |
| 25 | (1,275) | (7,235) | 5,960 | 154,946 |
| 26 | (1,782) | (7,916) | 6,134 | 161,080 |
| 27 | (2,246) | (8,572) | 6,325 | 167,406 |
| 28 | (2,661) | (9,185) | 6,524 | 173,929 |
| 29 | (3,056) | (9,782) | 6,726 | 180,655 |
| 30 | (3,422) | (6,015) | 2,592 | 183,248 |

(1) DEFERRED TAX AMOUNTS ARE COMPUTED AT A CORPORATE TAX RATE = 38.00%

Deferred tax debit balances indicate that a company is prepaying its accrued tax liability, in essence recognizing a tax deduction before it is actually taken with the IRS. Deferred tax debits arise from differences between the way taxes are calculated for book accounting purposes, and the way they are calculated by the Internal Revenue Service. In the case of FAS 106, this difference arises from the fact that companies implementing accrual accounting without prefunding will accrue or charge against current earnings retiree health care expenses which they will not pay (and deduct for IRS purposes) for many years to come. When they accrue these costs, generally accepted accounting principles permit companies to recognize a matching tax deduction.

However, for companies not prefunding, the IRS only permits tax deductions for current cash expenditures for retiree health care. For those companies not prefunding, this means there is a timing difference between tax deductions for book accounting purposes (current) and actual tax deductions taken with the IRS (in the future). In order to reconcile the two calculations, this difference in tax amounts is accounted for on corporate books as a deferred tax debit. Tax deductible contributions to a VEBA Trust in a prefunding transaction bring the timing of the book and tax calculations closer together. This resolves a little-understood accounting problem created by FAS 106 and permits corporations to better manage their tax liabilities.

Therefore, an important aspect of this invention, is its ability to show the amount of deferred tax debits created by the implementation of FAS 106 and exactly how much prefunding reduces these deferred tax debits.

In Compute Annual Cash Flow 96, the System 1 computes the annual cash flow within the VEBA trust. This amount takes into account premium purchases made by the Trust, an outflow, and death benefits, an inflow:

$ACF_t$=Cash flow, year (t)

$ACF_t = *PR_t + DBD_t$

Next, in Compute Internal rate of Return on Cash Flow 98, the System 1 computes the annual internal rate of return on the aforementioned cash flows, taking into account the asset accumulation within the Trust. Net outflows from premium purchases are compared to annual inflows from death benefits. The end of year cash value of the life insurance in the Trust is treated as a final positive cash flow. The internal rate of return is the discount rate at which the present value of these cash flows is equal to zero:

$IRR_t$ = Internal Rate of Return, year (t)

$$0 = \frac{*CV_t}{(1+IRR_t)^t} + \sum_{r=1}^{t} \frac{ACF_r}{(1+IRR_t)^r}$$

The output from the computations in Blocks 96 and 98 is shown as Table 10.

TABLE 10

XYZ CORPORATION
ILLUSTRATION I
RETURN ON INVESTMENT
(000's OMITTED)

| YEAR | BOY CASH PREMIUM | NOY DEATH BENEFITS DISTRIBUTED | ANNUAL CASH FLOW | EOY CASH SURRENDER VALUE | IRR ON CASH FLOW |
|---|---|---|---|---|---|
| 1 | ($10,001) | $0 | ($10,001) | $10,069 | 5.1% |
| 2 | (10,560) | 0 | (10,560) | 21,702 | 5.2% |
| 3 | (12,000) | 0 | (12,000) | 35,983 | 6.0% |
| 4 | (13,862) | 0 | (13,862) | 53,659 | 6.7% |
| 5 | (16,790) | 0 | (16,790) | 76,273 | 7.2% |
| 6 | (21,201) | 0 | (21,201) | 105,802 | 7.6% |
| 7 | (22,272) | 0 | (22,272) | 139,354 | 8.0% |
| 8 | (10,272) | 0 | (10,264) | 163,492 | 8.4% |
| 9 | (15,326) | 0 | (15,326) | 195,339 | 8.5% |
| 10 | 0 | 7,599 | 7,509 | 206,430 | 8.7% |
| 11 | 0 | 8,260 | 8,260 | 217,822 | 8.8% |
| 12 | 0 | 9,042 | 9,042 | 229,512 | 8.9% |
| 13 | 0 | 9,854 | 9,854 | 241,498 | 9.0% |
| 14 | 0 | 10,696 | 10,696 | 253,778 | 9.1% |
| 15 | 0 | 11,569 | 11,569 | 266,350 | 9.0% |
| 16 | 0 | 12,473 | 12,473 | 279,210 | 9.1% |
| 17 | 0 | 13,423 | 13,423 | 292,338 | 9.1% |

TABLE 10-continued

XYZ CORPORATION
ILLUSTRATION I
RETURN ON INVESTMENT
(000's OMITTED)

| YEAR | BOY CASH PREMIUM | NOY DEATH BENEFITS DISTRIBUTED | ANNUAL CASH FLOW | EOY CASH SURRENDER VALUE | IRR ON CASH FLOW |
|---|---|---|---|---|---|
| 18 | 0 | 14,404 | 14,404 | 305,728 | 9.2% |
| 19 | 0 | 15,413 | 15,413 | 319,379 | 9.2% |
| 20 | 0 | 16,452 | 16,452 | 333,284 | 9.2% |
| 21 | 0 | 17,497 | 17,497 | 347,462 | 9.2% |
| 22 | 0 | 18,530 | 18,530 | 361,955 | 9.3% |
| 23 | 0 | 19,552 | 19,552 | 376,807 | 9.3% |
| 24 | 0 | 20,567 | 20,567 | 392,069 | 9.3% |
| 25 | 0 | 21,615 | 21,615 | 407,754 | 9.3% |
| 26 | 0 | 22,672 | 22,672 | 423,896 | 9.3% |
| 27 | 0 | 23,729 | 23,729 | 440,541 | 9.3% |
| 28 | 0 | 24,817 | 24,817 | 457,709 | 9.3% |
| 29 | 0 | 25,944 | 25,944 | 475,409 | 9.4% |
| 30 | 0 | 27,123 | 27,123 | 493,640 | 9.4% |

Table 10 shows the rate of return the corporation is earning on its cash by investing in Trust Owned Life Insurance. The rate of return also helps the corporation determine the cost of its investment over a long horizon. In the example appearing in Table 10, the rate of return in the 30th year is 9.4%. Because the insurance contract earnings rate is 10%, the difference between the earnings rate and the rate of return is 60 basis points. This difference is the cost of the insurance to the corporation, which consists of administration charges, mortality charges, and other insurance expenses.

In Compute Incremental Investment 100, the System 1 isolates the incremental corporate cash investment in TOLI over the pay-as-you-go cost (which the corporation would have paid whether or not it decided to prefund):

$II_t$=Incremental investment, year (t)

$II_t = (CO_t + TS_t) - ATP_t$

At Compute IRR on Incremental Investment 102, the System 1 computes the annual internal rate of return on this incremental cash investment:

$III_t = IRR$ on Incremental Investment, year $(t)$ $$0 = \frac{*CV_t}{(1+III_t)^t} + \sum_{r=1}^{t} \frac{II_r}{(1+III_t)^r}$$

The output shown in Table 11 summarizes the computations made in Blocks 96–104.

TABLE 11

XYZ CORPORATION
ILLUSTRATION I
RATE OF RETURN ON VEBA TRUST INVESTMENT
(000's OMITTED)

| YEAR | YEAR END CASH VALUE OF TRUST | AFTER-TAX CASH FLOW WITH VEBA TRUST | AFTER-TAX CASH RETIREE MEDICAL COST | INCREMENTAL TRUST INVESTMENT | IRR OF OF TRUST (1) INVESTMENT |
|---|---|---|---|---|---|
| 1 | $10,069 | ($13,265) | ($7,064) | ($6,201) | 69.5% |
| 2 | 21,702 | (14,642) | (8,095) | (6,547) | 43.6% |
| 3 | 35,983 | (16,527) | (9,087) | (7,440) | 33.8% |
| 4 | 53,659 | (18,642) | (10,048) | (8,594) | 28.6% |
| 5 | 76,273 | (21,404) | (10,994) | (10,410) | 25.5% |
| 6 | 105,802 | (25,044) | (11,899) | (13,145) | 23.5% |
| 7 | 139,354 | (26,977) | (13,168) | (13,809) | 21.8% |
| 8 | 163,492 | (20,777) | (14,413) | (6,364) | 19.9% |
| 9 | 195,339 | (25,090) | (15,588) | (9,502) | 18.6% |
| 10 | 206,430 | (13,399) | (16,662) | 3,263 | 16.9% |
| 11 | 217,822 | (14,400) | (17,576) | 3,176 | 15.6% |
| 12 | 229,512 | (14,949) | (18,660) | 3,711 | 14.6% |
| 13 | 241,498 | (15,416) | (19,768) | 4,351 | 13.9% |
| 14 | 253,778 | (15,718) | (20,890) | 5,172 | 13.3% |
| 15 | 266,350 | (16,026) | (22,032) | 6,006 | 12.7% |

TABLE 11-continued

XYZ CORPORATION
ILLUSTRATION I
RATE OF RETURN ON VEBA TRUST INVESTMENT
(000's OMITTED)

| YEAR | YEAR END CASH VALUE OF TRUST | AFTER-TAX CASH FLOW WITH VEBA TRUST | AFTER-TAX CASH RETIREE MEDICAL COST | INCREMENTAL TRUST INVESTMENT (1) | IRR OF OF TRUST INVESTMENT |
|---|---|---|---|---|---|
| 16 | 279,210 | (16,407) | (23,176) | 6,769 | 12.3% |
| 17 | 292,338 | (17,288) | (24,120) | 6,832 | 12.0% |
| 18 | 305,728 | (17,298) | (25,100) | 7,803 | 11.7% |
| 19 | 319,379 | (17,259) | (26,118) | 8,860 | 11.5% |
| 20 | 333,284 | (17,272) | (27,185) | 9,913 | 11.3% |
| 21 | 347,462 | (17,430) | (28,268) | 10,838 | 11.1% |
| 22 | 361,955 | (18,473) | (28,890) | 10,417 | 10.9% |
| 23 | 376,807 | (18,059) | (29,496) | 11,437 | 10.8% |
| 24 | 392,069 | (17,522) | (30,058) | 12,536 | 10.7% |
| 25 | 407,754 | (16,899) | (30,567) | 13,667 | 10.6% |
| 26 | 423,896 | (16,229) | (31,007) | 14,777 | 10.5% |
| 27 | 440,541 | (15,563) | (31,316) | 15,754 | 10.4% |
| 28 | 457,709 | (14,616) | (31,559) | 16,943 | 10.4% |
| 29 | 475,409 | (13,530) | (31,718) | 18,189 | 10.3% |
| 30 | 493,640 | (12,298) | (31,786) | 19,488 | 10.3% |

(1) ANNUAL INVESTMENT EQUALS AFTER-TAX CASH FLOW MINUS AFTER-TAX RETIREE MEDICAL EXPENSE.

The analysis shown in Table 11 shows the incremental investment required for prefunding using TOLI. In addition this output provides decision-makers with an understanding of the advantages of the TOLI investment expressed in terms of internal rate of return (IRR) and present value (PV). Both IRR and PV are common bench marks used by corporate executives to measure the worthiness of a corporate investment. In the example appearing in Table 11, the internal rate of return gradually declines from 69.5 percent to 10.3 percent, as the importance of the tax deductions made possible by prefunding declines in importance relative to the time value of money.

Moving now to FIG. 3.6, Compute Annual Loan 106 is where the System 1 computes the amount of the annual loan required to fund the VEBA Trust. The logic of System 1 takes into account the incremental cash flow required to fund the VEBA and the excess cash resulting from the death benefits payable to the Trust in later years. These amounts go towards reducing the outstanding loan balance. Thus, a negative annual loan amount indicates loan repayment:

$BLB_t$ = Beginning loan balance, year $(t)$ $LIA_t$ = Loan interest accrued, year $(t)$ $AL_t$ = Annual loan, year $(t)$ $$AL_t = \begin{cases} -BLB_t, & \text{if } II_t > (BLB_t - LIA_t) \\ -II_t - LIA_t, & \text{otherwise} \end{cases}$$

In Compute BOY Loan Balance 108, the System 1 computes the cumulative beginning of year loan balance assuming the corporation were to borrow the funds placed in the VEBA trust:

$BLB_t$ = Beginning loan balance, year $(t)$ $$BLB_t = \text{greater of: } \begin{bmatrix} 0, \text{ or} \\ BLB_{t-1} + AL_{t-1} \end{bmatrix}$$

Then, in Compute Loan Interest Accrued 110, the System 1 computes the after-tax cost of the loan interest accrued on the total outstanding loan balance:

*$LR$ = Loan interest rate $LIA_t$ = After-tax loan interest accrued, year $(t)$ $$LIA_t = \text{lesser of: } \begin{bmatrix} 0, \text{ or} \\ -(BLB_t + AL_t) \times (1 - {}^*CT) \times {}^*LR \end{bmatrix}$$

Compute P&L Using Loan With TOLI 112 marks the computation of the profit and loss impact of corporate borrowing to fund a VEBA trust using TOLI:

$PLB_t$=Profit and loss with TOLI and borrowing, year (t)

$PLB_t = IBT_t + TB_t + LIA_t$

Finally in FIG. 3.6, in Compute Earnings Per Share 114, the System 1 finds the profit and loss effect of funding with borrowed funds is converted to earnings per share as follows:

$EPSB_t$=Earnings per share with borrowing, year (t)

$EPSB_t = PLB_t / {}^*SO$

Moving now to FIG. 3.7, at Compute Savings Per Share 116, the System 1 computes the savings per share of borrowing to fund a VEBA. Savings are expressed in comparison with the originally projected cash pay-as-you-go cost:

$SPSB_t$=Savings per share with borrowing, year (t)

$SPSB_t = EPSB_t - ATFES_t$

Table 12 summarizes the output from the computations appearing in Blocks 106–116.

TABLE 12

XYZ CORPORATION
ILLUSTRATION I
INCOME STATEMENT EFFECT WITH BORROWING
(000's OMITTED)

| YR | P&L EFFECT W/O TRUST | P&L EFFECT WITH TRUST | BEG. YR LOAN BAL. (1) | INCREMENTAL TRUST CASH FLOW (2) | ANNUAL LOAN (3) | LOAN INT. ACCRUED (4) | P&L EFFECT WITH TRUST & LOAN | EARN PER SH ($) (5) | SAV PER SH ($) (5,6) |
|---|---|---|---|---|---|---|---|---|---|
| 1 | ($26,358) | ($25,784) | $0 | ($6,201) | $6,201 | ($384) | ($26,169) | -2.62 | 9.02 |
| 2 | (27,400) | (26,323) | 6,201 | (6,547) | 6,932 | (814) | (27,137) | -2.71 | 0.03 |
| 3 | (28,286) | (26,542) | 13,132 | (7,440) | 8,254 | (1,326) | (27,868) | -2.79 | 0.04 |
| 4 | (29,169) | (26,565) | 21,387 | (8,594) | 9,920 | (1,941) | (28,506) | -2.85 | 0.07 |
| 5 | (30,046) | (26,308) | 31,307 | (10,410) | 12,351 | (2,707) | (29,015) | -2.90 | 0.10 |
| 6 | (30,915) | (25,653) | 43,658 | (13,145) | 15,851 | (3,690) | (29,342) | -2.93 | 0.16 |
| 7 | (31,760) | (24,763) | 59,509 | (13,809) | 17,498 | (4,774) | (29,537) | -2.95 | 0.22 |
| 8 | (32,460) | (24,227) | 77,007 | (6,364) | 11,138 | (5,465) | (29,692) | -2.97 | 0.28 |
| 9 | (33,137) | (23,157) | 88,145 | (9,502) | 14,967 | (6,393) | (29,550) | -2.95 | 0.36 |
| 10 | (33,794) | (22,813) | 103,113 | 3,263 | 3,130 | (6,587) | (29,400) | -2.94 | 0.44 |
| 11 | (34,434) | (22,707) | 106,243 | 3,176 | 3,411 | (6,799) | (29,506) | -2.95 | 0.49 |
| 12 | (35,054) | (22,582) | 109,654 | 3,711 | 3,088 | (6,990) | (29,572) | -2.96 | 0.55 |
| 13 | (35,488) | (22,269) | 112,741 | 4,351 | 2,639 | (7,154) | (29,423) | -2.94 | 0.61 |
| 14 | (35,879) | (21,908) | 115,380 | 5,172 | 1,982 | (7,276) | (29,185) | -2.92 | 0.67 |
| 15 | (36,218) | (21,488) | 117,362 | 6,006 | 1,270 | (7,355) | (28,843) | -2.88 | 0.74 |
| 16 | (36,497) | (20,999) | 118,632 | 6,769 | 586 | (7,392) | (28,390) | -2.84 | 0.81 |
| 17 | (36,716) | (20,438) | 119,218 | 6,832 | 560 | (7,426) | (27,865) | -2.79 | 0.89 |
| 18 | (36,847) | (19,780) | 119,778 | 7,803 | (376) | (7,403) | (27,183) | -2.72 | 0.97 |
| 19 | (36,918) | (19,050) | 119,401 | 8,860 | (1,457) | (7,313) | (26,362) | -2.64 | 1.06 |
| 20 | (36,915) | (18,234) | 117,944 | 9,913 | (2,601) | (7,151) | (25,385) | -2.54 | 1.15 |
| 21 | (29,447) | (9,940) | 115,344 | 10,838 | (3,687) | (6,923) | (16,863) | -1.69 | 1.26 |
| 22 | (29,285) | (8,939) | 111,657 | 10,417 | (3,495) | (6,706) | (15,645) | -1.56 | 1.36 |
| 23 | (29,074) | (7,871) | 108,162 | 11,437 | (4,731) | (6,413) | (14,254) | -1.43 | 1.48 |
| 24 | (28,809) | (6,729) | 103,431 | 12,536 | (6,123) | (6,033) | (12,762) | -1.28 | 1.60 |
| 25 | (28,487) | (5,505) | 97,308 | 13,667 | (7,634) | (5,560) | (11,065) | -1.11 | 1.74 |
| 26 | (28,100) | (4,190) | 89,674 | 14,777 | (9,218) | (4,988) | (9,178) | -0.92 | 1.89 |
| 27 | (27,651) | (2,784) | 80,456 | 15,754 | (10,765) | (4,321) | (7,105) | -0.71 | 2.05 |
| 28 | (27,216) | (2,316) | 69,691 | 16,943 | (12,622) | (3,538) | (5,855) | -0.59 | 2.14 |
| 29 | (26,732) | (652) | 57,069 | 18,189 | (14,650) | (2,630) | (3,282) | -0.33 | 2.35 |
| 30 | (26,202) | 1,059 | 42,419 | 19,488 | (16,858) | (1,585) | (526) | -0.05 | 2.57 |

(1) BEGINNING YEAR LOAN BALANCE EQUALS PREVIOUS YEAR'S LOAN BALANCE PLUS PREVIOUS YEAR'S LOAN.
(2) INCREMENTAL TRUST CASH FLOW ASSURED TO BE AT BEGINNING OF YEAR.
(3) ANNUAL LOAN AT BEGINNING OF YEAR. ANNUAL LOAN EQUALS PREVIOUS YEAR'S ACCRUED INTEREST PLUS INCREMENTAL TOLI CASH FLOW.
(4) LOAN INTEREST ACCRUED EQUALS BEGINNING YEAR LOAN BALANCE PLUS ANNUAL LOAN TIMES AFTER-TAX LOAN INTEREST RATE.
LOAN INTEREST RATE = 10.0%
TAX RATE = 38.0%
AFTER-TAX LOAN INTEREST RATE = 6.2%
(5) SHARES OUTSTANDING = 10,000,000
(6) SAVINGS PER SHARE VERSUS NET INCOME WITHOUT TRUST OWNED LIFE INSURANCE.

Table 12 shows that OPEB prefunding using TOLI is a worthwhile investment even assuming that the corporation does not have the cash resources to make the investment and must borrow the funds necessary to make the incremental Trust contributions. This example shows that the VEBA funding investment in TOLI generates a savings over the pay-as-you-go approach. The savings begins in the first year of the investment and increases from two cents per share in the first year of the funding program to $2.63 per share in the thirtieth year.

In Compute After Tax Cash Flow with Borrowing 118, the System 1 isolates the after-tax cash flow impact of borrowing:

$ATCFB_t$ = After tax cash flow with borrowing, year (t)

$ATCFB_t = II_t + AL_t + LIA_{t-1}$ (Note: $LIA_0 = 0$.)

Output from the computation in Block 118 is exemplified Table 13.

TABLE 13

XYZ CORPORATION
ILLUSTRATION I
AFTER TAX CASH FLOW WITH BORROWING
(000's OMITTED)

| YEAR | INCREMENTAL TRUST CASH FLOW | ANNUAL LOAN | AFTER LOAN INTEREST ACCRUED | TAX CASH FLOW (1) |
|---|---|---|---|---|
| 1 | ($6,201) | $6,201 | $0 | $0 |
| 2 | (6,547) | 6,932 | (384) | (0) |
| 3 | (7,440) | 8,254 | (814) | (0) |
| 4 | (8,594) | 9,920 | (1,326) | 0 |
| 5 | (10,410) | 12,351 | (1,941) | 0 |
| 6 | (13,145) | 15,851 | (2,707) | 0 |
| 7 | (13,809) | 17,498 | (3,690) | 0 |
| 8 | (6,364) | 11,138 | (4,774) | 0 |
| 9 | (9,502) | 14,967 | (5,465) | 0 |
| 10 | 3,263 | 3,130 | (6,393) | 0 |

TABLE 13-continued

XYZ CORPORATION
ILLUSTRATION I
AFTER TAX CASH FLOW WITH BORROWING
(000's OMITTED)

| YEAR | INCREMENTAL TRUST CASH FLOW | ANNUAL LOAN | AFTER LOAN INTEREST ACCRUED | TAX CASH FLOW (1) |
|------|------|------|------|------|
| 11 | 3,176 | 3,411 | (6,587) | 0 |
| 12 | 3,711 | 3,088 | (6,799) | 0 |
| 13 | 4,351 | 2,639 | (6,990) | 0 |
| 14 | 5,172 | 1,982 | (7,154) | 0 |
| 15 | 6,006 | 1,270 | (7,276) | 0 |
| 16 | 6,769 | 586 | (7,355) | 0 |
| 17 | 6,832 | 560 | (7,392) | 0 |
| 18 | 7,303 | (376) | (7,426) | 0 |
| 19 | 8,860 | (1,457) | (7,403) | 0 |
| 20 | 9,913 | (2,601) | (7,313) | 0 |
| 21 | 10,838 | (3,687) | (7,151) | 0 |
| 22 | 10,417 | (3,495) | (6,923) | 0 |
| 23 | 11,437 | (4,731) | (6,706) | 0 |
| 24 | 12,536 | (6,123) | (6,413) | 0 |
| 25 | 13,667 | (7,634) | (6,033) | 0 |
| 26 | 14,777 | (9,218) | (5,560) | 0 |
| 27 | 15,754 | (10,765) | (4,988) | 0 |
| 28 | 16,943 | (12,622) | (4,321) | 0 |
| 29 | 18,189 | (14,650) | (3,538) | (0) |
| 30 | 19,488 | (16,858) | (2,630) | 0 |

(1) THE AFTER TAX CASH FLOW IS COMPUTED ASSUMING BORROWING TO FUND ALL INCREMENTAL CASH FLOWS REQUIRED BY THE TOLI PROGRAM.

Table 13 demonstrates the after-tax cash flow effect of borrowing funds to invest in Trust Owned Life Insurance. For the example appearing in Table 13, the net after tax cash flow effect with borrowing is zero for all years. The analysis provided by System 1 shows that because of the tax advantages from funding, even assuming borrowing, the corporation does not have to burden its corporate cash flow to complete the funding process.

At Compute After-tax Increase in Net Worth 120, the System 1 computes the after-tax increase in net worth in borrowing to fund a VEBA trust:

$INW_t$=After tax increase in net worth, year (t)

$INW_t = *CV_t - BLB_{t+1}$

Compute Annual Increase in Net Worth 122 is where the System 1 computes the annual change in net worth assuming corporate borrowing to fund a VEBA trust:

$AINW_t$=Change in net worth, year (t)

$AINW_t = INW_t - INW_{t-1} + ATCFB_t$

Block 124, Compute Present Value on Net After-Tax Increase in Net Worth 124, is where the System 1 computes the present value of the after-tax increase in net worth in borrowing to fund a VEBA trust:

$PIN_t$ = Present value of increase in net worth, year (t)

$$PIN_t = \sum_{r=1}^{t} \frac{INW_r}{(1 + *DR)^r}$$

Output from the computations in Blocks 118 to 124 is shown in Table 14.

TABLE 14

XYZ CORPORATION
ILLUSTRATION I
PRESENT VALUE OF INCREASE IN NET WORTH WITH BORRMING (000's OMITTED)

| YEAR | YEAR END CASH VALUE OF TRUST | NET AFTER TAX YEAR END LOAN BALANCE | ANNUAL INCREASE INCREASE IN NET WORTH | IN NET WORTH (1) | PRESENT VALUE (2) |
|------|------|------|------|------|------|
| 1 | $10,069 | $6,201 | $3,868 | $3,868 | $3,364 |
| 2 | 21,702 | 13,132 | 8,570 | 4,701 | 6,480 |
| 3 | 35,983 | 21,387 | 14,596 | 6,027 | 9,597 |
| 4 | 53,659 | 31,307 | 22,352 | 7,756 | 12,780 |
| 5 | 76,273 | 43,658 | 32,615 | 10,263 | 16,215 |
| 6 | 105,802 | 59,509 | 46,292 | 13,678 | 20,014 |
| 7 | 139,354 | 77,007 | 62,347 | 16,054 | 23,439 |
| 8 | 163,492 | 88,145 | 75,347 | 13,000 | 24,631 |
| 9 | 195,339 | 103,113 | 92,226 | 16,880 | 26,217 |
| 10 | 206,430 | 106,243 | 100,188 | 7,961 | 24,765 |
| 11 | 217,822 | 109,654 | 108,169 | 7,981 | 23,250 |
| 12 | 229,512 | 112,741 | 116,771 | 8,602 | 21,825 |
| 13 | 241,498 | 115,380 | 126,118 | 9,347 | 20,498 |
| 14 | 253,778 | 117,362 | 136,416 | 10,299 | 19,280 |
| 15 | 266,350 | 118,632 | 147,718 | 11,302 | 18,154 |
| 16 | 279,210 | 119,218 | 159,992 | 12,273 | 17,097 |
| 17 | 292,338 | 119,778 | 172,560 | 12,568 | 16,035 |
| 18 | 305,728 | 119,401 | 186,327 | 13,767 | 15,056 |
| 19 | 319,379 | 117,944 | 201,435 | 15,108 | 14,154 |
| 20 | 333,284 | 115,344 | 217,940 | 16,505 | 13,316 |
| 21 | 347,462 | 111,657 | 235,805 | 17,566 | 12,529 |
| 22 | 361,955 | 108,162 | 253,793 | 17,988 | 11,725 |
| 23 | 376,807 | 103,431 | 273,376 | 19,583 | 10,983 |
| 24 | 392,069 | 97,308 | 294,761 | 21,385 | 10,297 |
| 25 | 407,754 | 89,674 | 318,080 | 23,319 | 9,663 |
| 26 | 423,896 | 80,456 | 343,440 | 25,360 | 9,072 |
| 27 | 440,541 | 69,691 | 370,850 | 27,411 | 8,518 |
| 28 | 457,709 | 57,069 | 400,640 | 29,789 | 8,002 |
| 29 | 475,409 | 42,419 | 432,990 | 32,350 | 7,520 |
| 30 | 493,640 | 25,561 | 468,079 | 35,089 | 7,069 |

(1) ANNUAL INCREASE IN NOT WORTH EQUALS AFTER TAX CASH FLOW NET OF DEBT SERVICE PLUS YEAR END CASH VALUE OF TRUST LESS THE LOAN BALANCE.
(2) PRESENT VALUE IS CALCULATED ON NET AFTER TAX INCREASE IN NET WORTH FOR EACH YEAR. THE DISCOUNT FACTOR IS = 15.00%

Table 14 illustrates the attractiveness of the corporate funding investment in present value terms, this time focusing on corporate net worth. The increase in corporate net worth resulting from funding the Trust using borrowed funds is discounted using the same discount rate which the corporation uses to measure its other investment alternatives. In this case, using an assumed corporate discount rate of 15 percent, the present value improvement in corporate net worth, after taking into account the effects of borrowing, grows from $3 million in the first year of funding to $26 million in the 9th year of the funding program.

In Compute Annual Expenditure of Trust Income 126, the System 1 computes the annual expenditures of the taxable Trust, assuming TOLI is not purchased. To accurately compare the financial performance of this taxable trust with a TOLI investment, the system logic assumes that taxable Trust expenditures match those made by a Trust which has invested in TOLI:

$AET_t$=Expenditure of trust income, year (t)

$AET_t$=Greater of $-*DB$, or $*P_t$

Turning now to FIG. 3.8, Compute Trust Cash Flow 128 is where the System 1 computes the taxable trust cash flow by computing Trust income net of Trust expenditures assuming no TOLI investment:

$TII_t$=After-tax trust interest income, year (t)

$TCF_t$=Trust cash flow, year (t)

$$TCF_t = TII_t + AET_t$$

At Compute Year End Trust Balance, at Block 130, the System 1 computes the year end taxable trust balance. This

TABLE 15

XYZ CORPORATION
ILLUSTRATION I
ASSET GROWTH IN A TAXABLE TRUST
(000's OMITTED)

| YEAR | BEGINNING YEAR TRUST BALANCE | ANNUAL CONTRIBUTION TO TRUST (1) | TRUST INTEREST INCOME (2) | ANNUAL EXPENDITURE OF TRUST INCOME (3) | TRUST CASH FLOW | YEAR END TRUST BALANCE |
|---|---|---|---|---|---|---|
| 1  | $0      | $10,001 | $690   | $0       | $690     | $10,691 |
| 2  | 10,691  | 10,550  | 1,466  | 0        | 1,466    | 22,718  |
| 3  | 22,718  | 12,000  | 2,396  | 0        | 2,396    | 37,114  |
| 4  | 37,114  | 13,862  | 3,517  | 0        | 3,517    | 54493   |
| 5  | 54,493  | 16,790  | 4,919  | 0        | 4,919    | 76,201  |
| 6  | 76,201  | 21,201  | 6,721  | 0        | 6,721    | 104,123 |
| 7  | 104,123 | 22,272  | 8,721  | 0        | 8,721    | 135,116 |
| 8  | 135,116 | 10,264  | 10,031 | 0        | 10,031   | 155,411 |
| 9  | 155,411 | 15,326  | 11,781 | 0        | 11,781   | 182,518 |
| 10 | 182,518 | 0       | 12,339 | (7,509)  | 4,830    | 187,343 |
| 11 | 187,348 | 0       | 12,647 | (8,260)  | 4,387    | 191,735 |
| 12 | 191,735 | 0       | 12,923 | (9,042)  | 3,881    | 195,617 |
| 13 | 195,617 | 0       | 13,163 | (9,854)  | 3,309    | 198,926 |
| 14 | 198,926 | 0       | 13,363 | (10,696) | 2,667    | 201,593 |
| 15 | 201,593 | 0       | 13,517 | (11,569) | 1,949    | 203,541 |
| 16 | 203,541 | 0       | 13,621 | (12,473) | 1,148    | 204,689 |
| 17 | 204,689 | 0       | 13,668 | (13,423) | 245      | 204,935 |
| 18 | 204,935 | 0       | 13,652 | (14,404) | (752)    | 204,182 |
| 19 | 204,182 | 0       | 13,566 | (15,413) | (1,847)  | 202,336 |
| 20 | 202,336 | 0       | 13,403 | (16,452) | (3,049)  | 199,287 |
| 21 | 199,287 | 0       | 13,157 | (17,497) | (4,339)  | 194,947 |
| 22 | 194,947 | 0       | 12,823 | (18,530) | (5,707)  | 189,240 |
| 23 | 189,240 | 0       | 12,394 | (19,552) | (7,157)  | 182,083 |
| 24 | 182,083 | 0       | 11,866 | (20,567) | (8,701)  | 173,382 |
| 25 | 173,382 | 0       | 11,230 | (21,615) | (10,385) | 162,997 |
| 26 | 162,997 | 0       | 10,478 | (22,672) | (12,195) | 150,802 |
| 27 | 150,802 | 0       | 9,600  | (23,729) | (14,129) | 136,673 |
| 28 | 136,673 | 0       | 8,589  | (24,817) | (16,228) | 120,445 |
| 29 | 120,445 | 0       | 7,431  | (25,944) | (18,513) | 101,932 |
| 30 | 101,932 | 0       | 6,113  | (27,123) | (21,010) | 80,922  |

(1) CONTRIBUTIONS TO THE TAXABLE TRUST MATCH INSURANCE PREMIUMS.
(2) TRUST INTEREST EARNED ON BEGINNING YEAR BALANCE, PLUS ADDITIONS TO THE TRUST. TRUST INCOME EXPENSE FOR MID-YEAR DEATH BENEFITS DISTRIBUTED.
TRUST INTEREST RATE = 10.0%
TRUST TAX RATE = 31.0%
(3) EXPENDITURES OF TRUST INCOME MATCH INSURANCE DEATH BENEFITS DISTRIBUTED.

is computed by showing the residual accumulation of Trust cash balances, after allowing for net inflows and outflows, and interest income:

$YETB_t$=Year end trust balance, year (t)

$$YETB_t = YETB_{t-1} + {}^*PR_t + TII_t + AET_t$$

At Compute Trust Interest Income 132, the System 1 computes the trust interest income in a VEBA Trust, assuming the Trust does not invest in TOLI, but instead invests in taxable instruments yielding the same before-tax rate of return as TOLI investments:

$TII_t$=Trust interest income, year (t)

$$TII_t = (*PR_t + YETB_{t-1}) \times ER \times (1 - *VT) + AET_t \times ((1 + (*ER \times (1 - *VT)))^{1/2} - 1)$$

The output in Table 15 summarizes the computations immediately above.

For those companies contemplating prefunding, the analysis underpinning Table 15 is important as it shows what the accumulation of assets would be in the absence of a TOLI investment. By using the same methodology as was used in computing the Trust assets assuming a TOLI investment, Table 15 sets the stage for a comparison between the two funding approaches.

This comparison is developed in Compute Difference 134, which computes the difference between assets in a Trust making taxable investments and a Trust investing in TOLI:

$DAT_t$=Difference in assets between a TOLI and taxable trust, year (t)

$$DAT_t = {}^*YVT_t - YETB_t$$

In Compute Percent Advantage Between Assets 136, the System 1 goes on to compute the advantage, expressed in percentage terms, of Trust's investment in TOLI over a comparable the investment in taxable assets:

APDT$_t$=Percentage difference of assets in TOLI versus taxable trust, year (t)

$APDT_t = DAT_t / \text{ABSOLUTE VALUE}(YETB_t)$

The output in Table 16 summarizes the computations made in Blocks 130–136.

TABLE 16

XYZ CORPORATION
ILLUSTRATION I
COMPARISON OF BALANCE SHEET ASSET GROWTHS
(000's OMITTED)

| YEAR | YEAR END INSURANCE CASH VALUE | YEAR END TAXABLE VESA TRUST ASSET | DIFFERENCE BETWEEN ASSETS | PERCENTAGE ADVANTAGE OF FUNDING WITH TOLI |
|---|---|---|---|---|
| 1 | $10,069 | $10,691 | ($622) | −5.8% |
| 2 | 21,702 | 22,718 | (1,016) | −4.5% |
| 3 | 35,983 | 37,114 | (1,130) | −3.0% |
| 4 | 53,659 | 54,493 | (833) | −1.5% |
| 5 | 76,273 | 76,201 | 71 | 0.1% |
| 6 | 105,802 | 104,123 | 1,679 | 1.6% |
| 7 | 139,354 | 135,116 | 4,238 | 3.1% |
| 8 | 163,492 | 155,411 | 8,081 | 5.2% |
| 9 | 195,339 | 182,518 | 12,821 | 7.0% |
| 10 | 206,430 | 187,348 | 19,082 | 10.2% |
| 11 | 217,822 | 191,735 | 26,087 | 13.6% |
| 12 | 229,512 | 195,617 | 33,895 | 17.3% |
| 13 | 241,498 | 198,926 | 42,572 | 21.4% |
| 14 | 253,778 | 201,593 | 52,185 | 25.9% |
| 15 | 266,350 | 203,541 | 62,809 | 30.9% |
| 16 | 279,210 | 204,689 | 74,520 | 36.4% |
| 17 | 292,338 | 204,935 | 87,403 | 42.6% |
| 18 | 305,728 | 204,182 | 101,546 | 49.7% |
| 19 | 319,379 | 202,336 | 117,043 | 57.8% |
| 20 | 333,284 | 199,287 | 133,997 | 67.2% |
| 21 | 347,462 | 194,947 | 152,515 | 78.2% |
| 22 | 361,955 | 189,240 | 172,715 | 91.3% |
| 23 | 376,807 | 182,083 | 194,724 | 106.9% |
| 24 | 392,069 | 173,382 | 218,687 | 126.1% |
| 25 | 407,754 | 162,997 | 244,757 | 150.2% |
| 26 | 423,896 | 150,802 | 273,094 | 181.1% |
| 27 | 440,541 | 136,673 | 303,868 | 222.3% |
| 28 | 457,709 | 120,445 | 337,263 | 280.0% |
| 29 | 473,409 | 101,932 | 373,477 | 366.4% |
| 30 | 493,640 | 80,922 | 412,718 | 510.0% |

For those companies contemplating funding a Trust using taxable instruments, the analysis shown in Table 16 provides a measure of the advantage of using TOLI. The example analysis appearing in Table 16 shows that without a TOLI investment, fund balances will accumulate to only $81 million by the end of the thirtieth year, while using the TOLI approach, Trust assets will grow to $494 million, an advantage of over 500 percent.

In Compute Surrender Value 138, the System 1 computes the value of the assets assuming the insurance policy is surrendered, and the corporation is required to pay taxes on the asset accumulation in the Trust. This analysis is provided to allow an evaluation of the effects of policy surrender. While policy surrender is an unlikely event, corporations, in evaluating an extremely long term investment such as a TOLI purchase, typically evaluate a large number of scenarios, including a change in existing laws. These computations will permit an understanding of the implications of a change in the tax laws regarding insurance:

ASV$_t$=After-tax surrender value of insurance contract plus cash reserves, year (t)

$ASV_t = *SV_t + ACR_t$

Finally in FIG. 3.8, Compute Difference between Assets 140 compares the surrender value of the TOLI investment to Trust assets assuming an investment in taxable instruments:

DAS$_t$=Difference in surrender value of assets between TOLI and taxable trust, year (t)

$DAS_t = ASV_t - YETB_t$

Moving now to FIG. 3.9, in Compute Percent Advantage 142, the System 1 computes the percent advantage of the non-taxable insurance assets over the after-tax surrender value of the taxable trust assets:

APDS$_t$=Percentage difference of surrender value of assets between TOLI and taxable trust, year (t)

$APDS_t = DAS_t / \text{ABSOLUTE VALUE}(YETB_t)$

The results are used in constructing Table 17.

TABLE 17

XYZ CORPORATION
ILLUSTRATION I
TOLI ASSET BALANCE UPON SURRENDER
VERSUS TAXABLE ASSET BALANCE
(000's OMITTED)

| YEAR | TOLI SURRENDER VALUE (1) | YEAR END TAXABLE VEBA ASSET | DIFFERENCE TRUST ASSETS | PERCENTAGE ADVANTAGE OF FUNDING WITH TOLI |
|---|---|---|---|---|
| 1 | $10,069 | $10,691 | ($622) | −5.8% |
| 2 | 21,702 | 22,718 | (1,016) | −4.5% |
| 3 | 35,983 | 37,114 | (1,130) | −3.0% |
| 4 | 53,659 | 54,493 | (833) | −1.5% |
| 5 | 76,014 | 76,201 | (187) | −0.2% |
| 6 | 103,949 | 104,123 | (174) | −0.2% |
| 7 | 135,101 | 135,116 | (15) | −0.0% |
| 8 | 156,160 | 155,411 | 749 | 0.5% |
| 9 | 184,258 | 182,518 | 1,741 | 1.0% |
| 10 | 191,113 | 187,348 | 3,764 | 2.0% |
| 11 | 198,126 | 191,735 | 6,390 | 3.3% |
| 12 | 205,299 | 195,617 | 9,682 | 4.9% |
| 13 | 212,632 | 198,926 | 13,707 | 6.9% |
| 14 | 220,129 | 201,593 | 18,537 | 9.2% |
| 15 | 227,791 | 203,541 | 24,250 | 11.9% |
| 16 | 235,618 | 204,689 | 30,928 | 15.1% |
| 17 | 243,598 | 204,935 | 38,664 | 18.9% |
| 15 | 251,732 | 204,182 | 47,550 | 23.3% |
| 19 | 260,021 | 202,336 | 57,686 | 28.5% |
| 20 | 268,466 | 199,287 | 69,179 | 34.7% |
| 21 | 277,084 | 194,947 | 82,137 | 42.1% |
| 22 | 285,910 | 189,240 | 96,670 | 51.1% |
| 23 | 294,980 | 182,083 | 112,897 | 62.0% |
| 24 | 304,335 | 173,382 | 130,953 | 75.5% |
| 25 | 313,986 | 162,997 | 150,990 | 92.6% |
| 26 | 323,961 | 150,802 | 173,159 | 114.8% |
| 27 | 334,296 | 136,673 | 197,623 | 144.6% |
| 28 | 345,005 | 120,445 | 224,560 | 186.4% |
| 29 | 356,098 | 101,932 | 254,166 | 249.3% |
| 30 | 367,575 | 80,922 | 286,654 | 354.2% |

(1) TOLI SURRENDER VALUE EQUALS AFTER-TAX SURRENDER VALUE OF INSURANCE CONTRACT PLUS ACCUMULATION OF TAXABLE CASH RESERVES.

As the output in Table 17 shows, even assuming the corporation is forced to surrender the TOLI policies and pay taxes on the asset accumulation in them, there is a clear advantage from using the TOLI method of funding.

After the System 1 has completed all of the above-mentioned computations, the system user reviews the system output for performance (Block 144). The user checks to see that the insurance contract provides an acceptable return. In IRR Adequate branch 146, the user checks to see that the Internal Rate of Return on Cash Flow is adequate. If the Internal Rate of Return, which is computed in Block 98, is substantially less than the earnings rate on VEBA investments assumed by the corporation, then the insurance contract is not offering a superior financial return. In Funding Liability 148, the user checks to see that the liability has been adequately funded. If the assets do not offset the liability (see Block 70) or the stream of cash flows from death benefits does not match (see Block 56) or exceed the pay as you go cost (see Block 34), then the funding requirements for System 1 are not met. A user query at Insurance Advantage 150 asks whether the assets generated by insurance are greater than those in VEBA Trust investing in taxable financial instruments. This determines whether it is advantageous to use insurance contracts in a VEBA trust.

If the answer to any of the queries 146–150 is "no," the user changes the underlying assumptions. Options include: changing the insured population in Block 152; changing the premium and coverage of the insurance policy, changing the reinvestment of death benefits and/or taking out policy distributions, in Block 154; or, requesting an illustration from a different carrier in Block 156. All these options will change the performance of the insurance contract.

If different assumptions are required to change the performance of the contract, then a new illustration request is sent to the carrier via return Z1 to FIG. 2, thereby reinitiating the system's processes. Otherwise, the logic ends.

While a particular embodiment of the present invention has been disclosed, it is to be understood that various different modifications are possible and are within the true spirit of the invention, the scope of which is to be determined with reference to the claims set forth below. There is no intention, therefore, to limit the invention to the exact disclosure presented herein as a teaching of one embodiment of the invention.

What is claimed is:

1. A digital electrical computer and data processing system comprising:

a digital electrical computer, an input device for inputting data electrically connected to the digital electrical computer, and an output device electrically connected to the digital electrical computer, wherein the digital electrical computer is controlled by a computer program to form a programmed digital electrical computer for processing input electrical signals, the input electrical signals being produced in response to information entered at the input device, the information including a description of a taxable trust, a description of life insurance contracts, and respective projections for expenses, liabilities, and cash flows for corporate benefits defined by Statement 106, the processing including modifying the input electrical signals into output electrical signals representing a projection of a prefunding program for Other Postretirement Employee Benefits under the Statement 106, the output electrical signals being communicated to the output device which, in response to the output electrical signals, generates a depiction of the projection.

2. The programmed digital electrical computer of claim 1, wherein the output electrical signals representing a projection includes output electrical signals representing a projection of cash flow.

3. The programmed digital electrical computer of claim 1, wherein the output electrical signals representing a projection includes output electrical signals representing a projection of earnings.

4. The programmed digital electrical computer of claim 1, wherein the output electrical signals representing a projection includes output electrical signals representing a projection of liabilities.

5. The digital electrical computer and data processing system of any one of claims 2–4 or 8, wherein the description of a taxable trust entered at the input device is a description of a taxable Voluntary Employee Beneficiary Association trust.

6. The programmed digital electrical computer of claim 1, wherein the description of a taxable trust entered at the input device is a description of a taxable Voluntary Employee Beneficiary Association trust and the Information entered at the input device includes a projection of a qualified asset account limit.

7. A method for using a digital electrical computer and data processing system, the method comprising the steps of:

providing a digital electrical computer and data processing system comprising a digital electrical computer electrically connected to an input device for inputting data and to an output device;

programming the digital electrical computer to receive input electrical signals produced in response to information entered at the input device, the information including a description of a taxable trust, a description of life insurance contracts, and respective projections for expenses, liabilities, and cash flows for corporate benefits defined by Statement 106, to process the input electrical signals into modified electrical signals representing a projection of a prefunding program for Other Postretirement Employee Benefits under the Statement 106, and to output the modified electrical signals to the output device so that a depiction of the projection is produced at the output device; and entering the information at the input device, processing the input electrical signals with the programmed digital electrical computer, and producing the depiction.

* * * * *